United States Patent [19]
Khudenko

[11] Patent Number: 5,514,277
[45] Date of Patent: May 7, 1996

[54] TREATMENT OF WASTEWATER AND SLUDGES

[76] Inventor: Boris M. Khudenko, 744 Moores Mill Rd., Atlanta, Ga. 30327

[21] Appl. No.: 102,618

[22] Filed: Aug. 5, 1993

Related U.S. Application Data

[63] Continuation-in-part of Ser. No. 46,788, Apr. 12, 1993, abandoned.

[51] Int. Cl.$^6$ .............................. C02F 3/30; C02F 11/04
[52] U.S. Cl. .......................... 210/603; 210/605; 210/623; 210/631
[58] Field of Search .................................. 210/605, 607, 210/615–617, 622–626, 630, 631, 603, 610, 611

[56] References Cited

U.S. PATENT DOCUMENTS

| | | | |
|---|---|---|---|
| 4,824,563 | 4/1989 | Iwahori et al. | 210/605 |
| 4,999,111 | 3/1991 | Williamson | 210/624 |
| 5,160,043 | 11/1992 | Kos | 210/605 |
| 5,213,681 | 5/1993 | Kos | 210/605 |
| 5,246,585 | 9/1993 | Meiring | 210/630 |
| 5,288,405 | 2/1994 | Lamb, III | 210/625 |

*Primary Examiner*—Thomas G. Wyse
*Attorney, Agent, or Firm*—Needle & Rosenberg

[57] ABSTRACT

A system for wastewater and sludge treatment utilizes an anaerobic reactor to modify the wastewater and generate sludge and liquid effluent. The sludge is transferred to a conditioner wherein anaerobic, aerobic and chemical means may be utilized to cultivate the required strains of organisms and break down various pollutants. Various chemicals may be solubilized, or precipitated, or adsorbed to remove them from the waste stream. Aerobic conditioning may be used to increase the volume of sludge, and to increase the temperature of the sludge. A shell having multiple compartments can provide for the entire process by utilizing the upper portion for anaerobic reaction and the lower portion for conditioning. An aerobic reactor can be disposed centrally of the conditioning compartments. Pipes and pumps can be used to transfer components from one compartment to another, and to discharge the cleaned effluent. The sludge is further subjected to aerobic reaction and bioheating. Some chemicals may be added to assist in removal of heavy metals and other toxic substances. Finally, the sludge and water are separated, and the sludge is dried.

33 Claims, 20 Drawing Sheets

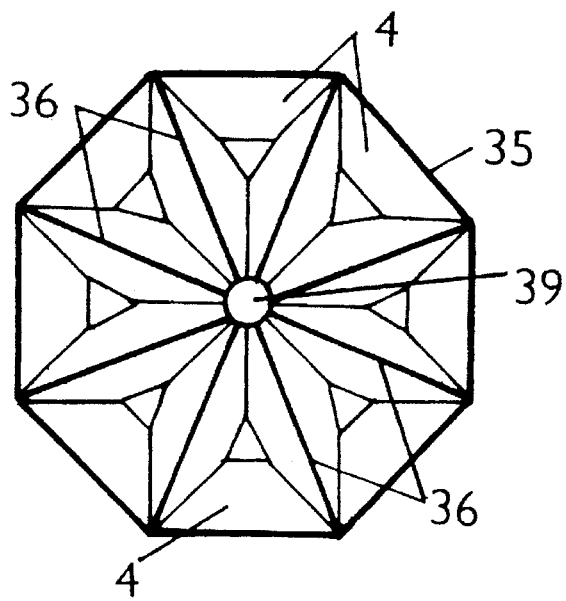
FIG. 9
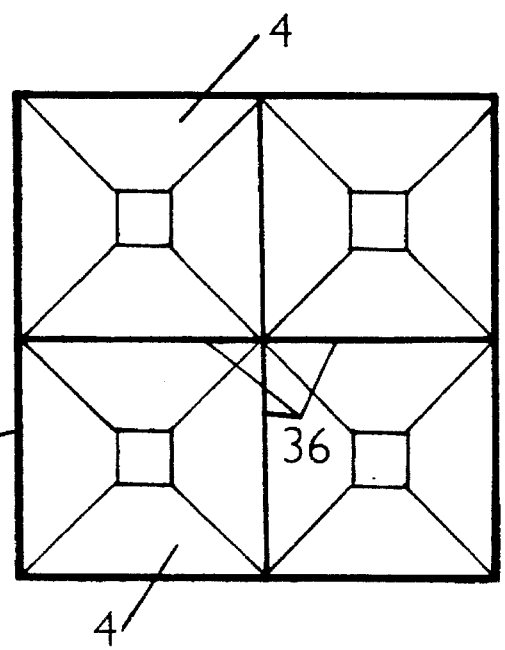
FIG. 11
FIG. 10
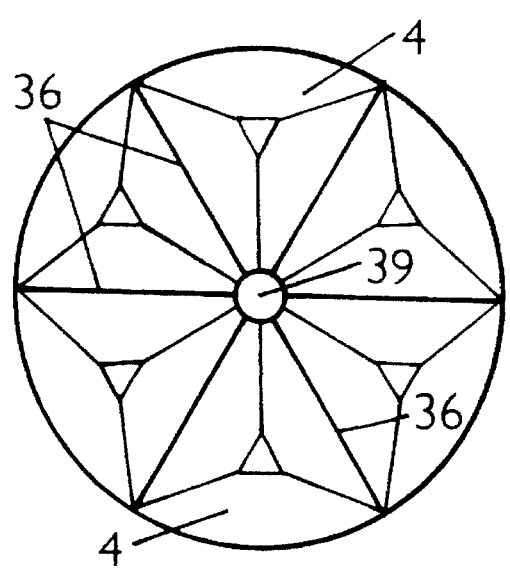

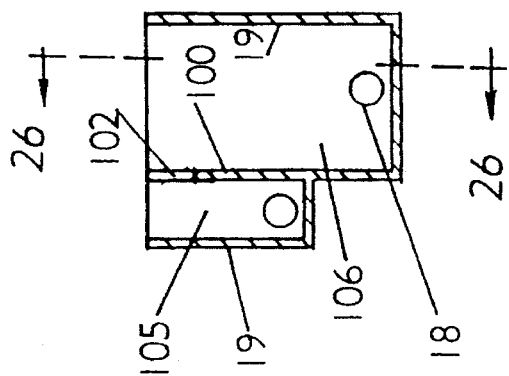
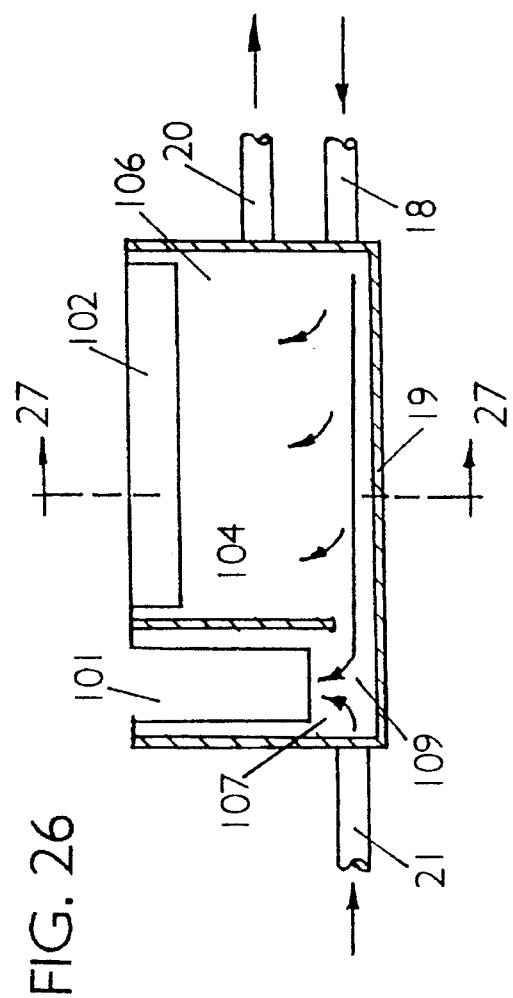
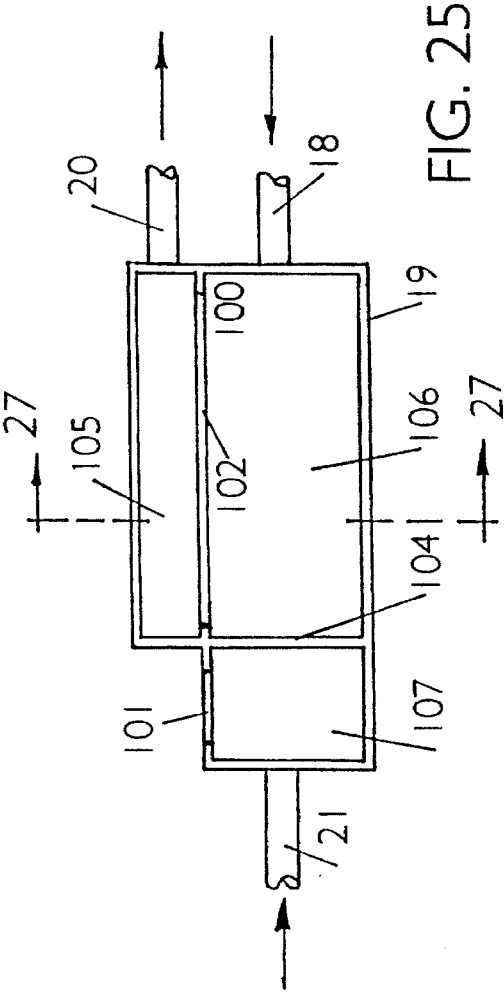

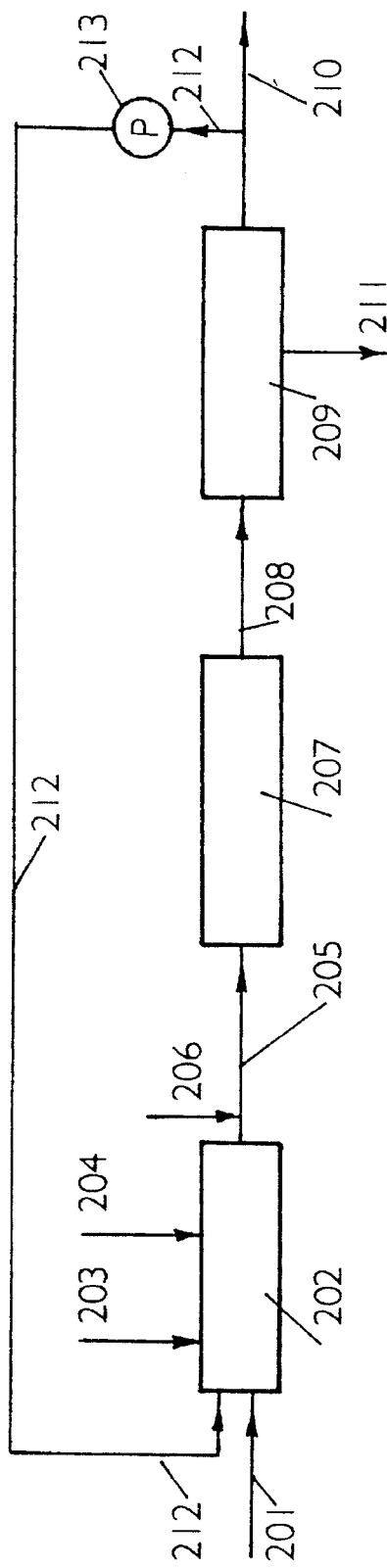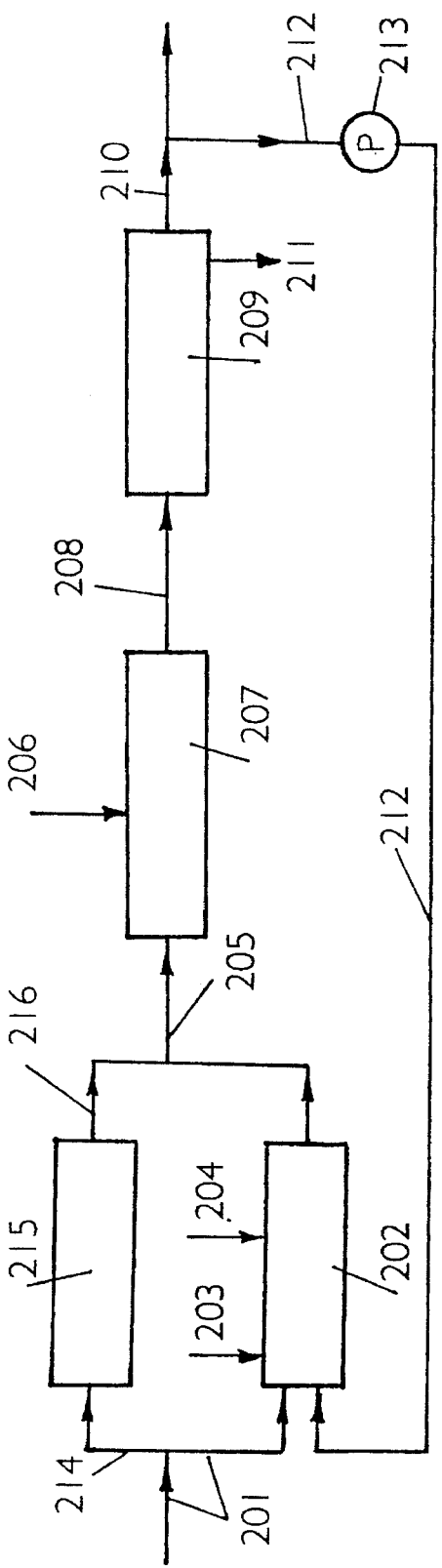

TREATMENT OF WASTEWATER AND SLUDGES

CROSS-REFERENCE TO RELATED APPLICATION

This application is a continuation-in-part of the application by the same inventor, titled "Anaerobic Treatment of Wastewater" filed Apr. 12, 1993, and having application Ser. No. 08/046,788, now abandoned.

BACKGROUND OF THE INVENTION

1. Field of the Invention

This invention relates generally to the treatment of wastewater and wastewater sludges, and is more particularly concerned with anaerobic treatment wherein the sludge is conditioned and recycled to the anaerobic reactor, or directed to dewatering and drying.

2. Description of the Prior Art

Anaerobic treatment of wastewater and wastewater sludges is well known in the art. In the past this technology was used mainly for sludge digestion and for simplified treatment of small wastewater streams in septic tanks. Recently, the anaerobic method has been applied to treat larger flows of a more concentrated industrial wastewater, primarily in the food and beverage industries. These more recent applications have revealed general advantages and disadvantages of anaerobic treatment methods. Additionally, fundamental research has been conducted on treatment of more complex wastewater, including industrial wastewater samples and imitations thereof with poorly degradable and toxic organics. This research demonstrated additional capabilities, advantages and problems associated with anaerobic processes. The present status of anaerobic treatment technologies is very thoroughly described in a recent book, *Design of Anaerobic Processes for the Treatment of Industrial and Municipal Wastes,* edited by J. F. Malina and F. G. Pohland, Technomic Publishing Inc., 1992. Additionally, in 1992–1993 the applicant conducted a study of anaerobic treatment of a complex wastewater, which is used in this application to demonstrate advantages of the new and improved method.

Two major anaerobic treatment methods were developed in the past: (1) attached growth processes; and, (2) suspended growth processes. Some modifications are classified as hybrids of these methods. Advantages and disadvantages of prior methods are given in the above mentioned book. The major advantages of anaerobic systems are the low energy requirements, with potentially a net generation of energy, and a relative simplicity of treatment units and operations. Disadvantages of prior anaerobic treatment systems are summarized as follows:

1. Only wastewater with simple soluble substrate (easily degradable nontoxic constituents) can be adequately treated anaerobically.
2. Suspended solids in the wastewater influent are not satisfactorily degraded unless retention time in the reactor is very long.
3. Slowly and poorly degradable, or toxic, soluble constituents of the wastewater influent are not degraded unless retention time in the reactor is very long, or a bed of granular activated carbon (GAC) is provided. In the latter case, a portion of the GAC bed must be periodically replaced due to the accumulation of nondegraded adsorbed material.
4. Liquid in anaerobic reactors often turns acidic due to the accumulation of fatty acids. This can be caused by an overloading with organics, or by a toxic effect of specific constituents in the feed. Accumulation of fatty acids and the respective drop in pH cause depletion in the methanogenic population. Further accumulation of fatty acids may cause suppression in the growth of acidogens. Inadequate growth of either group of organisms results in a process upset. Since methanogenic organisms have very slow growth rate, the anaerobic process recovery takes a long time. This problem becomes especially difficult during start-up operations because acidity control requires large quantities of alkalies, and the start-up process may last many months, and sometimes a year or longer.
5. Toxic discharges (for example, slugs of acidic or alkalinic wastewater, or wastewater having elevated concentrations of toxic constituents) can poison the entire sludge population in the reactor, thus requiring a long restarting time.
6. Two temperature regimes are used in anaerobic processes: thermophilic (about 55° C.) and mesophilic (about 33° C.). At temperatures lower than mesophilic, the process rate becomes very slow.
7. Anaerobic processes are not intended for controlling nutrients and heavy metals.
8. Anaerobic processes generate odorous gases such as hydrogen sulfide, and volatile organics. Accordingly, gases need to be collected even at small treatment plants, and are usually combusted.
9. Anaerobic reactors for wastewater treatment have deficient systems for water distribution, gas collection, and sludge separation. Foam and scum often are accumulated in the upper sections of anaerobic reactors.
10. Anaerobic reactors require a large area, because structural and cost considerations limit the total reactor height to 6 to 9 meters.

In summary, the above mentioned problems numbered 1 to 7 are related to a deficient sludge management strategy in prior art anaerobic wastewater treatment systems, and problems numbered 8 to 10 are related to deficient designs of anaerobic reactors. These two fundamental deficiencies limit the use of anaerobic treatment systems and cause operational problems in many of the systems already built.

Sludges generated in wastewater treatment processes, for example in biofiltration or activated sludge process, are usually directed for either aerobic or anaerobic biological stabilization. Sludge thickening may precede biological stabilization. Methods of sludge thickening include: gravity thickening in tanks designed as settling tanks, sometimes with gentle mixing; pressure air flotation; thermal gravity thickening/flotation thickening; vibratory filters; drum screens; and centrifuges.

During biological stabilization, sludge is substantially mineralized and becomes nonrotting; however, it retains a large proportion of water, which makes sludge disposal difficult. Accordingly, sludges are usually dewatered and dried, which may be accomplished on drying beds-the method preferred at smaller plants. Separate dewatering and drying are used at larger plants, the methods including vacuum filtration, filter pressing, centrifugation, etc. Separate methods of drying include drying beds, rotary drums, fluidized bed dryers, dryers with opposite jets, etc. Sometimes sludges are thickened, dewatered and dried without biological stabilization, or a chemical stabilization is used instead.

Thermal gravity thickening, and thermal gravity/flotation thickening show significant advantages over other thickening methods. These methods are described in the book *Utilization of Wastewater sludges*, by A. Z. Evilevich and M. A. Evilevich, Publishing House Stroyizdat, Leningrad (S. Peterburgh), 1988 (in Russian) and in Soviet Certificates of Invention Nos.: 300420, 1971; 381612, 1973; 1118623, 1984. Advantages include more rapid and more efficient separation (thickening) of sludge particles from water. A major disadvantage of these methods is in that heating of the sludge prior to the separation is done by a heat carrier, for example steam, which requires additional complex equipment, heat exchangers or the like, and energy from external sources (such as fuel). Sometimes flotation is not stable and portions of the sludge hang up in the mid depth or settle to the bottom of the flotation tank. Additionally, odor due to generation of hydrogen sulfide often occurs.

SUMMARY OF THE INVENTION

In the present invention, wastewater influent and conditioned anaerobic sludge are fed into an anaerobic reactor where they are mixed. The reactor effects removal from the water and at least partial transformation of constituents of concern; then, the effluent is discharged from the reactor and directed to a sludge separator for separating the anaerobic sludge from the water. Optionally, a periodic batch reactor (sequencing batch) can be used. The reactor volume, or a fraction thereof, can be used as a sludge separator in the batch reactor. The water may be discharged in units for further treatment, or to the environment. The separated sludge is directed into a sludge conditioner, and the bulk of the conditioned sludge is recycled in the anaerobic reactor. The balance of the sludge, equal to the sludge growth amount, is discharged to a sludge disposal or utilization facility.

The sludge conditioning of the present invention may include anaerobic conditioning, a combination of aerobic and anaerobic steps, chemical conditioning, and a combination of chemical and biological conditioning steps including aerobic and anaerobic steps and combinations thereof.

A novel reactor for carrying out the method of the present invention comprises a vertical shell with a domed roof. The bottom part of the shell may be used for the sludge conditioning zone, while the upper part of the structure houses the reaction zone. Wastewater influent is fed in the upper, reaction, zone, and a portion of the sludge from the lower, conditioning, zone is fed to the upper zone. Each zone may be independently mixed. The treated wastewater can be transferred from the reaction zone to a sludge separator. Sludge from the sludge separator can be returned to the bottom of the structure in the sludge conditioning zone. The treated separated water may be discharged from the system, while the gas generated in the reaction and sludge conditioning zones is collected and evacuated at the top of the structure.

In a sequencing batch reactor, the volume of the reactor, or a fraction of such volume, may be used to accommodate the sludge separation zone. Optionally, this zone may be provided with means for degassing the sludge and diverting the gas flow from the sludge separation means. Sludge separation means such as centrifuges or filtration devices may also be used in sequencing batch reactors with sludge conditioning.

A further objective of the present invention is to provide a method and apparatus for sludge thickening which does not require energy from external sources, and does not need complex equipment for sludge heating and for sludge flotation. The method is also stable and efficient. Moreover, the method can be combined with sludge stabilization, and with sludge dewatering and drying.

The present invention is based on the ability of aerobic bacteria to consume oxygen for oxidation of organics in the sludge. This is an exothermic process that causes the sludge temperature to rise. The heating effect becomes greater when the concentration of organics in the sludge and the concentration of oxygen in the oxidizer are greater. In any case, it is possible to bring the temperature of activated sludge removed from the bottom of clarifiers, or a mixture of activated sludge and sludge from primary clarifiers to 60°–70° C. with the use of air as the oxidizer. In colder climates and at low concentrations of organics, oxygen or oxygen enriched air can be used as an oxidizer. Oxygen enrichment increases the available heat due to less heat loss from the nitrogen present in the air. The increasing of the sludge temperature by aeration will be herein referred to as bioheating.

As in heating with an external heat source, bioheating increases the rate and the efficiency of sludge separation due to lower viscosity of the water phase. However, there is no need for additional energy or fuel, and there is no need for additional heating equipment.

An additional and novel step in the present invention involves bioflotation, which is the process of sludge flotation by gas bubbles generated after the aerobic sludge has been exposed to anaerobic conditions. Under anaerobic conditions, gas is generated by acidogenic bacteria (carbon dioxide), methanogenic bacteria (methane and carbon dioxide), sulfate reducers (carbon dioxide and hydrogen sulfide), and denitrifying bacteria (nitrogen). The process of gas generation and bioflotation can be controlled by controlling the growth and activity of various groups of organisms.

The process of bioflotation is well known. However, improvements for controlling this process are provided herein. These improvements include, separately or in combination, the following:

1) Sludge is bioheated before bioflotation, which increases the process rate and insures bioflotation in colder climates. Bioflotation is achieved by subjecting the sludge to anaerobic conditions wherein methane, carbon dioxide, and/or nitrogen are preferably formed. In some instances, hydrogen sulfide will also be formed. These gases float up the sludge.

The anaerobic reaction step of the bioheated sludge can be conducted on a drying bed, and any presently known type of bed can be used. During this reaction, the sludge is floated up leaving a clear water layer at the bottom. Clear water rapidly filters through the drainage provided at the bed. The floated layer of the thickened sludge subsides down to the bed surface and is kept there until dry.

Alternatively, the anaerobic step and flotation can be performed in separate flow-through reactor and separator (flotator). These steps can also be performed in a batch reactor: first, anaerobic reaction is carried out, followed by sludge flotation. After the thickened sludge and water are separated, the sludge is directed to a dryer. Any dryer used for sludge drying can be used.

2) Nitrates and nitrites are added to and mixed with the aerobically bioheated sludge, or immediately after the bioheating step in order to promote, respectively, denitrification and sludge flotation. The addition of nitrates accelerates the process described in previous paragraphs.

3) The sludge flow is split into parallel aerobic bioheating and anaerobic digestion steps. In the anaerobic step, a long sludge age is maintained to cultivate acidogenic, methanogenic and denitrifying bacteria. Methanogenic and denitrifying bacteria consume fatty acids generated by the acidogenic organisms. At a longer sludge age, methanogenic and denitrifying bacteria deplete the fatty acids and other organic sources required for the growth of sulfate reducing bacteria. Accordingly, the growth of sulfur reducers is suppressed, the hydrogen sulfide is generated in very small quantities, and the process can be kept substantially odor free.

The effluent sludges from both aerobic bioheater and anaerobic conditioner are mixed in the next process step. In this step, conducted without aeration, carbon dioxide, methane, and nitrogen are generated, form bubbles and float up the sludge particles. In a continuous process, the reaction in the mixed aerobic and anaerobic sludges is conducted in a separate reactor, while flotation is conducted in a separate settling (flotation) type tank. Alternatively, the reaction between aerobic and anaerobic sludges and flotation are conducted in a batch reactor wherein a rapid mixing of predetermined portions of anaerobic and aerobic sludges is conducted first, followed by biological reaction with or without mixing, and by sludge flotation (during the biological reaction) without mixing or after the mixing is stopped. Such control strategy accelerates bioflotation, insures process stability and high efficiency in cold and warm climates, and eliminates the problem of odors.

The steps of reacting the mixture of the aerobic and anaerobic sludges can be conducted on any conventional drying bed. During this reaction, the sludge is also floated up, leaving a clear water layer at the bottom. Clear water rapidly filters through the drainage provided at the bed. The floated layer of the thickened sludge subsides down to the bed surface and is kept there until dry.

BRIEF DESCRIPTION OF THE DRAWINGS

These and other features and advantages of the present invention will become apparent from consideration of the following specification, when taken in conjunction with the accompanying drawings in which:

FIG. 9 is a horizontal cross-sectional view of a bottom part of a polygonal structure similar to that shown in FIG. 8;

FIG. 10 is a horizontal cross-sectional view of a bottom part of a circular structure similar to that shown in FIG. 8;

FIG. 11 is a horizontal cross-sectional view of a bottom part of a square structure similar to that shown in FIG. 8;

FIG. 23 is a sequencing batch reactor with a gravity separator built in;

FIG. 25 is a top plan view of a splitter box for use with the present invention;

FIG. 26 is a cross-sectional view taken along the line 26—26 in FIG. 21;

FIG. 27 is a cross-sectional view taken along the line 27—27 in FIG. 20;

FIG. 30 is a flow chart of a system for sludge thickening made in accordance with the present invention, with sludge bioheating and bioflotation;

FIG. 31 is a modified form of the system for sludge thickening comprising parallel aerobic bioheating and anaerobic sludge conditioning steps followed by a bioflotation step;

DETAILED DESCRIPTION OF THE EMBODIMENTS

Figure 1:
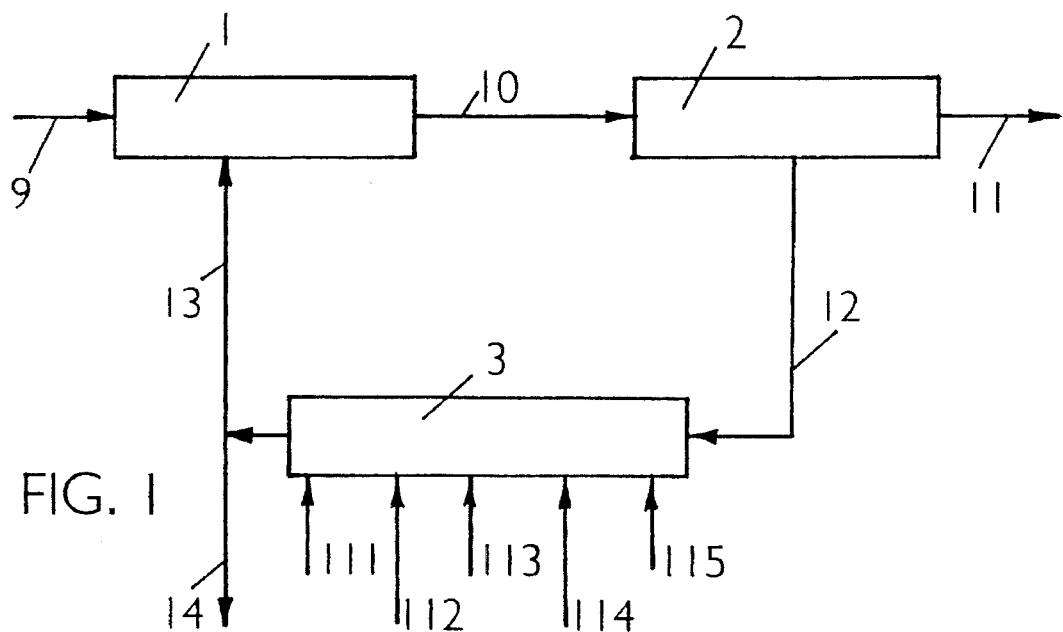
FIG. 1 is a flow chart of an anaerobic system made in accordance with the present invention, with a sludge conditioner.

Referring now more particularly to the drawings, and to that embodiment of the invention shown in FIG. 1, there is an anaerobic reactor 1 with an influent conduit 9 and a line 10 connecting the reactor 1 to a sludge separator 2. The sludge separator 2 is connected to a sludge conditioner 3 by a line 12, and a line 11 is provided from the sludge separator for the liquid effluent. A line 13 connects the sludge conditioner 3 to the anaerobic reactor 1, and a line 14 is provided to discharge sludge to the environment, or otherwise remove it from the present processing system.

The sludge conditioner 3 includes a plurality of inlets 111, 112, 113,114 and 115 for feeding nutrients, liquid or solid organics, sulfur bearing reagents, powdered activated carbon and microquantities of specific pollutants respectively into the sludge conditioner 3. Alternatively, similar inlets can be provided in the reactor 1 for feeding the pollutants directly into the reactor.

In operation, wastewater influent and recycled sludge (second anaerobic sludge, or the second-phase anaerobic sludge) are fed via lines 9 and 13 into the anaerobic reactor 1. The wastewater influent contains soluble and insoluble organics, and some constituents of wastewater may be poorly or slowly biodegradable, or toxic. The recycled sludge carries anaerobic microorganisms in bioflocs and/or granules. The sludge also includes enzymes produced by the microorganisms, alkalinity due to the bicarbonates and specific reagents added, or produced in the course of sludge conditioning. In reactor 1, the organic matter fed with the wastewater undergoes transformations. First, there is partial solubilization and coagulation-flocculation of suspended solids, so that the remaining suspended solids can be separated from the mixed liquor in the sludge separator. Second, conversion of the bulk of soluble organics by acidogenic organisms into fatty acids, followed by a conversion of fatty acids by methanogenic organisms (the second-phase anaerobic sludge) into methane. Both acidogenic and methanogenic organisms (the first-phase anaerobic sludge) will also produce carbon dioxide. Additionally, a fraction of incompletely converted organics, including poorly and slowly soluble and toxic organics, will be adsorbed by the biological mass in the reactor. These adsorbed organics will be separated from the mixed liquor in the sludge separator, and will not be present in the effluent from the anaerobic process stage.

The acidogenic microorganisms (the first-phase anaerobic sludge) are partially grown in the anaerobic reactor and in the sludge conditioner, while the methanogenic organisms (the second anaerobic sludge) are cultivated substantially in the sludge conditioner.

For use as the anaerobic reactor, either a suspended growth (mixed reactors) or an attached growth reactor can be used. In the suspended growth reactor, the bulk of the methanogenic sludge is brought from the sludge conditioner. As an attached growth reactor, upflow or downflow packed media reactor, or a suspended sludge blanket reactor, with or without support media (particles of sand or granular activated carbon) can be used. In the attached growth reactor, a partial retention and accumulation of methanogenic sludge occurs in the reactor itself. The rest of the methanogenic sludge is brought from the sludge conditioner.

Mixed liquor with the first anaerobic sludge from the anaerobic reactor is transferred through the line 10 to the sludge separator 2. The sludge can consist of flocculent or granular particles or both. The sludge separation step can be accomplished in a gravity separator (settling tank, clarifier, suspended sludge blanket clarifier, etc.), in a filtration device (granular media filters, screens, membranes, etc.), centrifuges, or other means for solid-liquid separation. The anaerobically treated wastewater is evacuated from the sludge separator 2 via line 11, and the separated sludge is transferred to the sludge conditioner 3 via the line 12.

In the sludge conditioner 3, the first anaerobic sludge is treated in accordance with particular requirements of the system. Sludge in the sludge conditioner constitutes only a fraction of the wastewater influent by volume. Accordingly, a very long retention time in the sludge conditioner (weeks to months) is possible at a comparatively small volume of the sludge conditioners. The sludge conditioner 3 may be an anaerobic process, or a combination of anaerobic and aerobic biological processes, and chemical and physical chemical processes.

In the course of anaerobic treatment in the sludge conditioner, the flocculate suspended solid particles are solubilized, and the products of solubilization are decomposed into fatty acids, and further into methane and carbon dioxide. The organics adsorbed in the sludge in the anaerobic reactor, including slowly and poorly degradable and toxic materials, are largely degraded over a long solids retention time.

Sludge recycle from the sludge conditioner 3 brings to the anaerobic reactor 1 a substantial amount of alkalinity so that, in combination with the acid consumption by the recycled methanogens, the pH in the reactor is well buffered with little or no alkalinic reagent requirements.

Sulfates, nitrates, nitrites and chromates are reduced to sulfides, nitrogen, and trivalent chromium. These processes may occur in the anaerobic reactor or in the sludge conditioner, or both. Sulfides will precipitate heavy metals, for example, copper, mercury, zinc, chromium. Since the bulk of sulfides can be associated with calcium, magnesium, and iron, addition of sulfur-bearing species, sulfur, sulfuric acid, polysulfides, etc., can be provided in the anaerobic reactor or in the sludge conditioner (via inlet 113). Reduction of nitrates and nitrites (for example, recycled to the anaerobic reactor with aerobically treated and nitrified water) results in removal of a nutrient, nitrogen.

If wastewater influent has substantial concentrations of poorly, or slowly degradable organics, for example certain surfactants, or toxic, partially degradable organics, for example methylene chloride or chloroform, powdered activated carbon can be added to the reactor or to the sludge conditioner (via inlet 114) in order to adsorb these constituents and retain them in the system, mainly in the sludge conditioner, for a longer time so these constituents will be substantially degraded.

In the case of toxic slugs in the wastewater influent, the sludge in the anaerobic reactor becomes poisoned and inactivated. This may happen in any reactor type, without exception. In the present method with the sludge conditioning step, the sludge stored and undergoing the conditioning in the sludge conditioning step is off line and is not poisoned by the toxic slug of wastewater; accordingly, only a short-duration process upset may occur.

The conditioned sludge from the conditiner 3 is fed in the anaerobic reactor 1 via line 13. A portion of the conditioned sludge, which is equal to the amount grown and accumulated over a given period of time, is discharged via line 14 over the same period of time.

Figure 2:
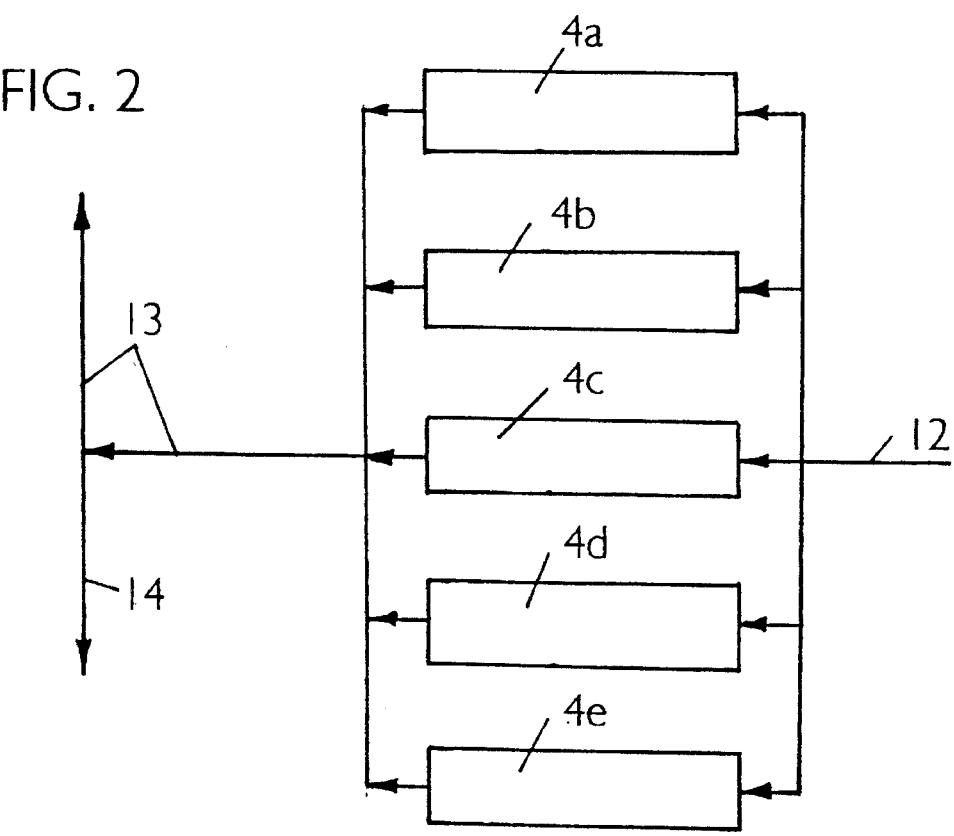
FIG. 2 is a flow chart of a multichannel sludge conditioner for use in the system of FIG. 1.

FIG. 2 illustrates one form of sludge conditioner 3 which comprises multiple parallel anaerobic compartments of equal size, designated at 4a to 4e, with a manifold 12 for sludge infeed and a manifold 13 for sludge outfeed. A line 14 is provided for sludge discharge, either to the environment or to another processing system.

The sludge conditioning is arranged as a multichannel system with parallel compartments of equal volume, each compartment being operated in a semibatch mode. For example, sludge from the compartment 4e is recycled to the anaerobic reactor 1, while all other compartments are in the batch mode, conditioning the sludge without any sludge exchange with the reactor 1. The compartments are in a queue, and can be put in the recycle mode for a specified period on a sequential basis (for example, at a recycle period equal to one week per compartment, the total turnaround period for five compartments will be five weeks, or the sludge age increment due to the sludge conditioner is five weeks).

Figure 3:
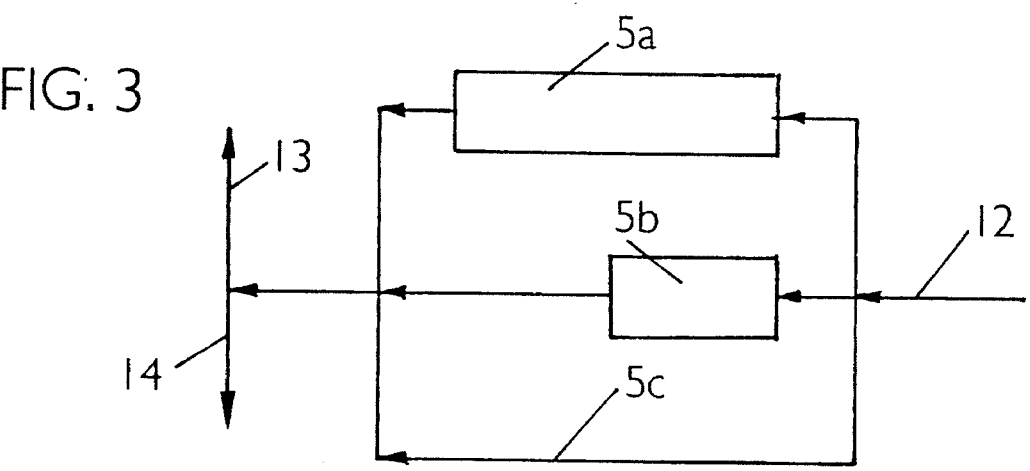
FIG. 3 is a modified form of a multichannel sludge conditioner.

FIG. 3 shows another sludge conditioner 3, this conditioner comprising multiple parallel anaerobic compartments 5a, 5b and 5c. The different compartments have different volumes, the compartment 5c being a by-pass with a zero volume. The manifold 12 provides for sludge infeed, manifold 13 for sludge outfeed, and pipe 14 for sludge discharge.

In this conditioner, the sludge conditioning step involves substeps of continuous sludge conditioning in parallel compartments of different sizes. Such treatment permits cultivation of the combined recycle sludge with a broad range of sludge age, so various groups of organisms can be propagated. For example, the short-time compartment 5c will support the growth of acidogenic organisms, the medium-time compartment 5b will provide good growth of organisms responsible for solubilization of suspended solids, and the long-time compartment 5a will support methanogenic growth.

Figure 4:
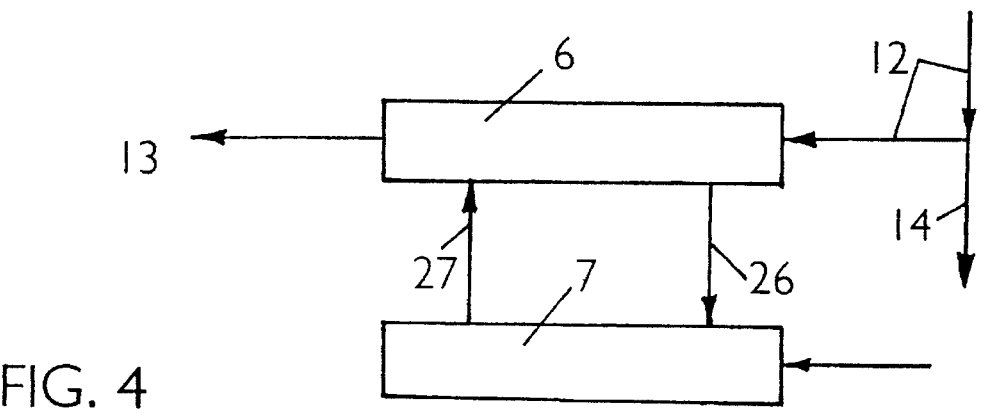
FIG. 4 is a flow chart of a sludge conditioner comprising parallel anaerobic and aerobic steps.

FIG. 4 shows a sludge conditioner 3 comprising an anaerobic compartment 6 and an aerobic compartment 7, the two compartments being connected by lines 26 and 27 for sludge transfer between them. The line 12 is for sludge infeed, 13 for outfeed, and 14 for sludge discharge. There is a line 28 for feeding oxygen, air, or enriched air supply in the aerobic compartment 7.

The sludge conditioner 3 is subdivided into an anaerobic compartment 6 and aerobic compartment 7. A portion of the sludge from the anaerobic compartment 6 is fed to the aerobic compartment 7, and the aerobically treated sludge is returned to the anaerobic compartment 6. In the aerobic compartment 7, some organics, especially those resistant to the anaerobic transformations, will undergo aerobic destruction. Because the aerobic processes have greater sludge yield, the mass of sludge grown in the system will increase as compared to anaerobic processes. This will create mass capable of adsorbing organic and inorganic constituents in the anaerobic reactor 1, and removing respective pollutants from the wastewater influent.

Aerobic treatment is also one means for raising the temperature of the sludge in the sludge conditioner. The increased temperature increases the process rate and the degree of organics destruction. Moreover, the organisms and enzymes generated in the heated sludge conditioner will be active, although not self sustaining, in the anaerobic reactor. This will be useful for treatment of wastewater that is at low temperatures. Alternatively, the heating could be achieved by the use of conventional sludge heating.

Figure 5:
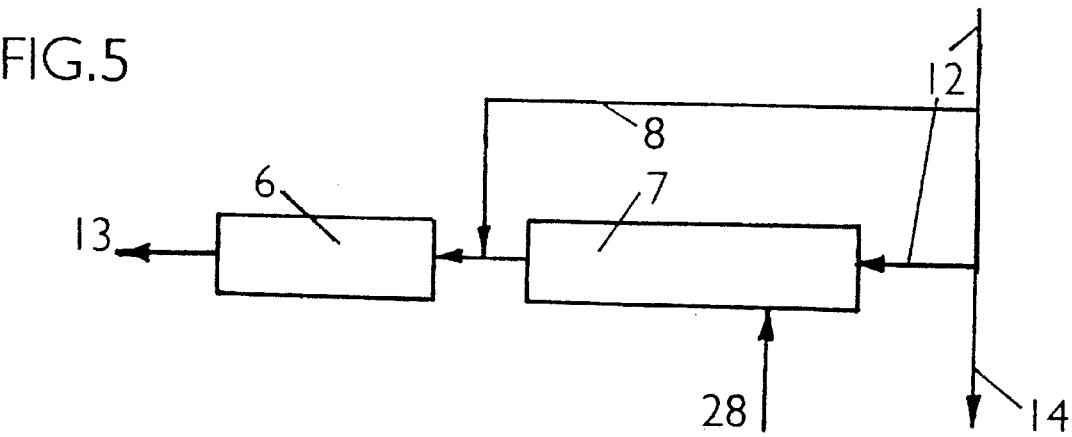
FIG. 5 is a flow chart of a sludge conditioner comprising sequential aerobic and anaerobic steps.

FIG. 5 shows a sludge conditioner 3 comprising an aerobic compartment 7 and an anaerobic compartment 6 connected in series by a line 29. If desired, there may be a line 8 for by-passing the aerobic compartment 7 and directing the sludge into the anaerobic compartment 6. As in the previously described embodiments, there is an infeed line 12 and an outfeed line 13. The discharge line 14 by-passes the compartment 7 and immediately discharges the sludge.

In the device of FIG. 5, a portion of the sludge from the sludge separator 2 is fed to the aerobic compartment 7. The aerobically treated sludge is subsequently transferred to the anaerobic compartment 6. The balance of the sludge from the sludge separator is by-passed directly to the anaerobic compartment 6. In the aerobic compartment 7, some organics, especially those resistant to the anaerobic transformations, will undergo aerobic destruction. Because the aerobic processes have greater sludge yield, the mass of sludge grown in the system will increase as compared to the use of anaerobic processes only. This will create mass capable of adsorbing organic and inorganic constituents in the anaerobic reactor 1 and removing respective pollutants from the wastewater influent. As is mentioned above, the aerobic treatment will also increase the temperature of the sludge.

Figure 6:
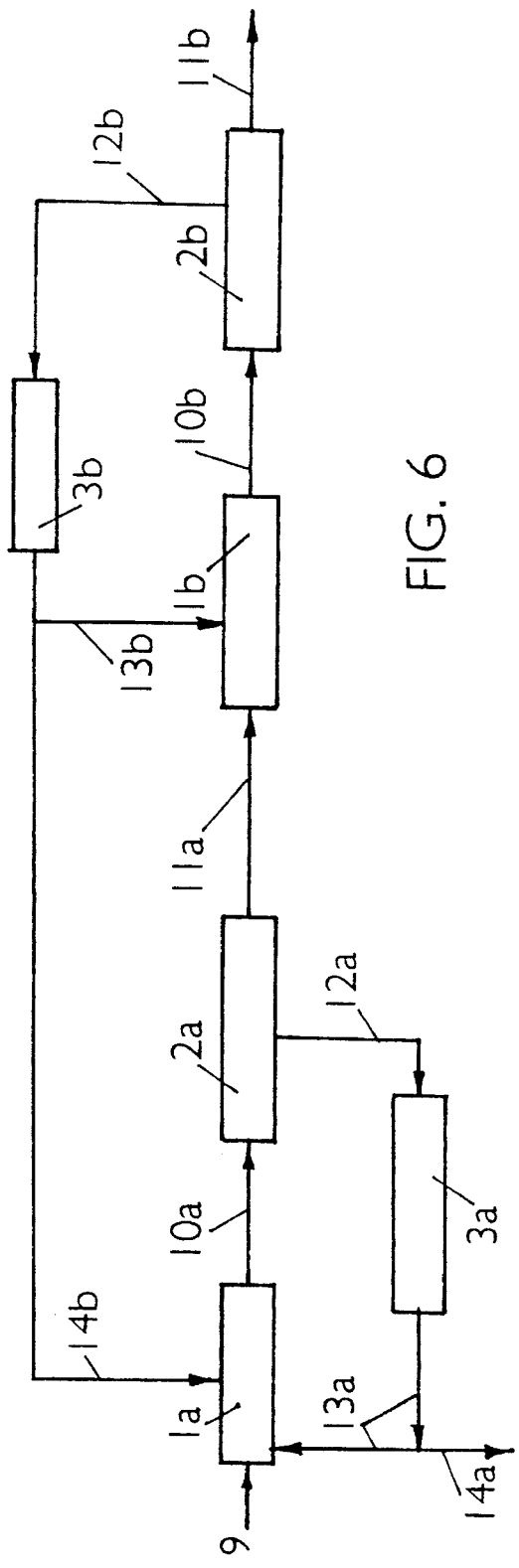
FIG. 6 is a flow chart of a multiple stage anaerobic system with sludge conditioners in each stage.

Referring now to FIG. 6 of the drawings, a multiple stage anaerobic system with sludge conditioning is illustrated. There is a first stage anaerobic reactor 1a, a sludge separator 2a, and a sludge conditioner 3a arranged as discussed in connection with FIG. 1, and the lines are numbered as in FIG. 1 with a suffixes. In the system of FIG. 6, however, the effluent line 11a is connected to the second stage of the system. The second stage of the system is also like the system of FIG. 1, and the parts are numbered the same, with a b suffix. It will be seen that the discharge 14b returns to the first stage anaerobic reactor 1a.

In this embodiment of the invention, the wastewater influent is subjected to treatment in a multiple stage anaerobic system with sludge conditioning. The wastewater influent is fed into the anaerobic reactor 1a via line 9, and the influent undergoes treatment as previously described. The mixed liquor is then transferred to the sludge separator 2a via line 10a. From the sludge separator 2a, the sludge is directed through the line 12a to the sludge conditioner 3a, where it undergoes the transformations previously described. The conditioned sludge is partially recycled to the anaerobic reactor 1a through the line 13a, and the balance is discharged via line 14a. The wastewater effluent from the sludge separator 2a is fed in the anaerobic reactor 1b via line 11a, where it undergoes the treatment as previously described; then, the mixed liquor is transferred to the sludge separator 2b via line 10b. From the sludge separator 2b, the sludge is directed through the line 12b to the sludge conditioner 3b, where it undergoes the transformations as previously described. The conditioned sludge is partially recycled to the anaerobic reactor 1b by the line 13b, and the balance is transferred to the first process stage anaerobic reactor 1a via line 14b.

The advantage in the use of two or more stages is in the effect of "counterflow" of the sludge and the wastewater. In particular, the poorly degradable and especially poorly adsorbable organics will be partially removed in the first process stage. The sludge in the sludge conditioner will substantially transform the poorly degradable and poorly adsorbable organics; however, due to the nature of these organics, the residual quantity of them will be recycled back to the first stage anaerobic reactor, and therefore will be lost from the first stage sludge separator. These residual quantities will be additionally removed in the second process stage. This advantage is also very important for the removal of heavy metals. In a one-stage process, the sludge circulating in the system is loaded with heavy metals, so that the new portions of the wastewater influent bring new quantities of heavy metals in contact with sludge already substantially saturated with heavy metals. Such sludge has low accumulation capacity and cannot hold additional heavy metals. In the two or more stage process, the first stage sludge removes the bulk of heavy metals. In the second stage, much "cleaner" sludge scavenges the residual heavy metal admixtures.

Figure 7:
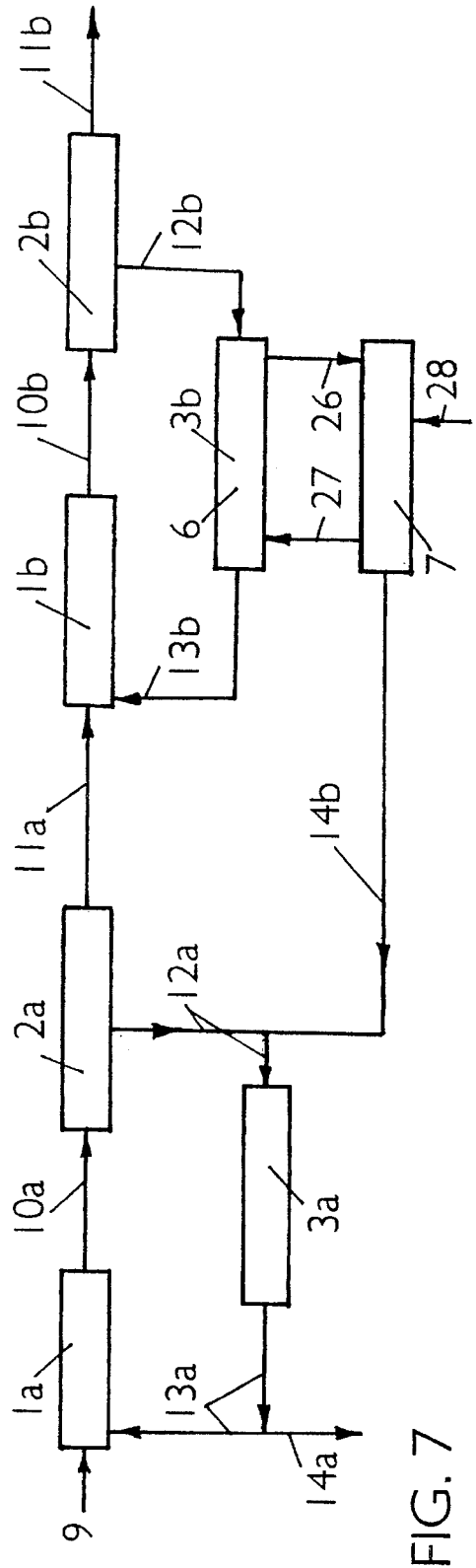
FIG. 7 is a flow chart of a multiple stage anaerobic system with sludge conditioners in each stage, the second stage conditioner including an aerobic process step.

FIG. 7 illustrates another multiple stage anaerobic system with sludge conditioning, this system being the system of FIG. 6 with a sludge conditioner as shown in FIG. 4. The parts are numbered as in FIG. 6 and in FIG. 4. It will be seen that the effluent line 11a leads to the second stage reactor 1b, and the discharge line 14b from the second stage leads to the line 12a for input to the conditioner 3a. Other parts and connections are as previously discussed.

In operation of this embodiment, the wastewater influent is subjected to treatment in a multiple stage anaerobic system with sludge conditioning. The wastewater influent is fed into the anaerobic reactor 1a via line 9, where it undergoes the treatment as previously described; then, the mixed liquor is transferred to the sludge separator 2a via line 10a. From the sludge separator 2a, the sludge is directed through the line 12a to the sludge conditioner 3a, where it undergoes the transformations as previously described. The conditioned sludge is partially recycled to the anaerobic reactor 1a by the line 13a, and the balance is discharged via line 14a.

The wastewater effluent from the sludge separator 2a is fed into the anaerobic reactor 1b via line 11a where it undergoes the treatment as previously described, then the mixed liquor is transferred to the sludge separator 2b via line 10b. From the sludge separator, the sludge is directed through line 12b to the sludge conditioner 3b, where it undergoes the transformations previously described. The conditioned sludge is partially recycled to the anaerobic reactor 1b by the line 13b, and partially fed via line 26 into the aerobic conditioner 7. A portion of the aerobically conditioned sludge is returned to the anaerobic conditioner 3b, and the balance is transferred to the first process stage anaerobic sludge conditioner 3a via line 14b. The advantages of the two or more stage arrangement has been discussed above.

Referring to FIGS. 8, 9, 10, and 11, there is shown a combined structure for anaerobic reactor and sludge conditioner. The structure consists of a polygonal (FIG. 9), cylindrical (FIG. 10), or square (FIG. 11) vertical shell 35 with a domed top 37. The domed top may be a pyramid, or a cone, or other similar shape. The top 37 then mounts a gas collection section 33, and a gas discharge pipe 34. The inside bottom part of the structure has a pyramidal or conical shape. The bottom part accommodates the sludge conditioner to constitute the sludge conditioning zone, while the upper part is for the anaerobic reactor to constitute the anaerobic reactor zone.

Figure 8:
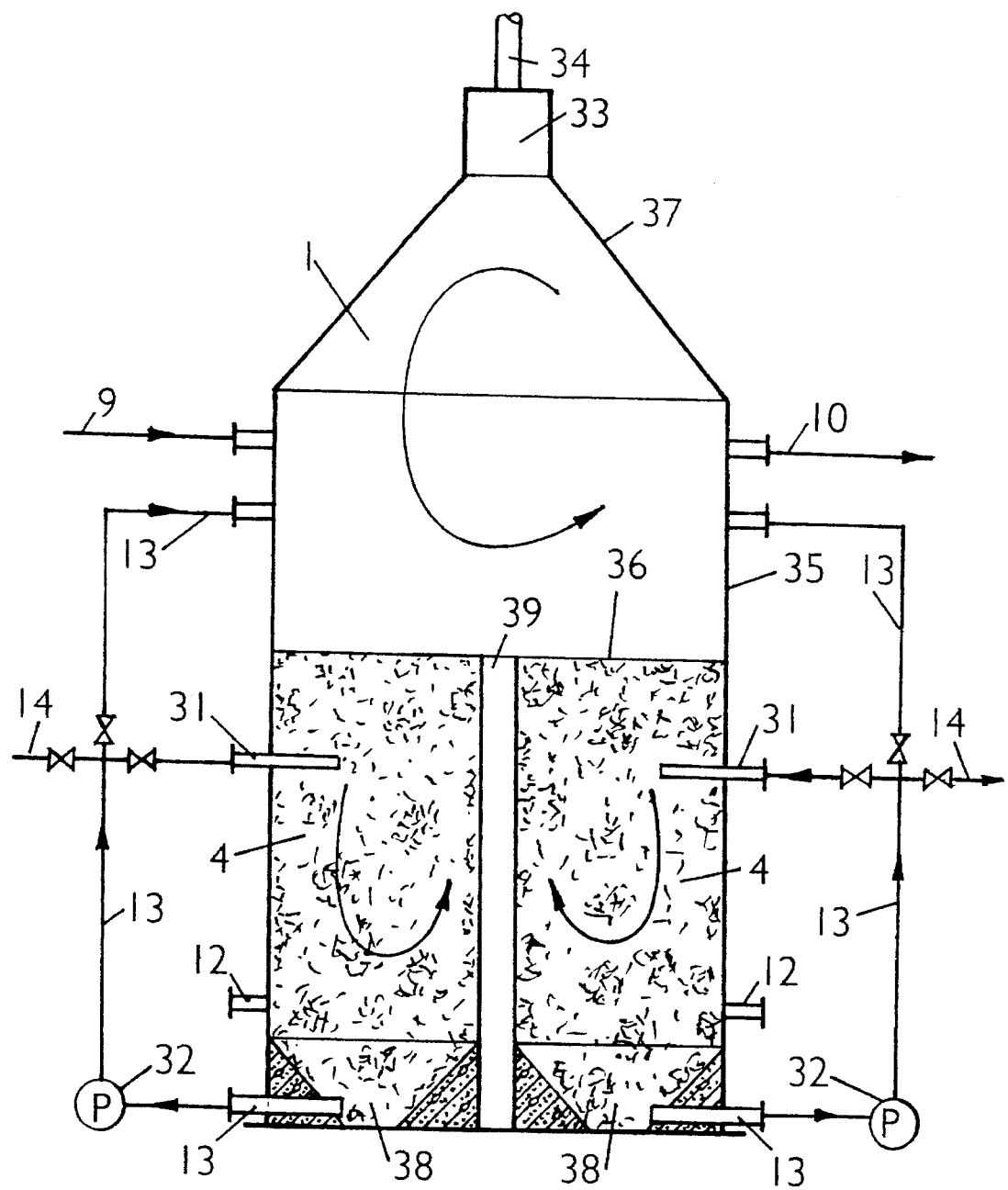
FIG. 8 is a vertical cross-sectional view of a structure made in accordance with the present invention for anaerobic treatment of wastewater.

Optionally, the lower part of the structure is separated into multiple compartments 4 (FIGS. 9, 10 and 11) by vertical walls 36. A central connection element 39 may be also provided as shown in FIGS. 8, 9 and 10. Pyramidal bottom 38 is provided in each sludge conditioning compartment 4, and each compartment 4 is provided with outlet pipes 13 and 31, and a pump 32 as means for moving the sludge to effect mixing.

The upper part of the structure may be separated into multiple compartments by extending some or all of the partitions 36 upward into the gas collection section 36 above the liquid level.

Lines 9 for wastewater influent and 10 for discharge of the anaerobic mixed liquor are provided in the upper part of the structure. Pipes 13 and pumps 32 are provided for moving the sludge between the sludge conditioning zones 4 and the reactor zone 1. Pipes 12 and 14 are provided in the sludge conditioning compartments 4 for transferring the sludge from a sludge separator to the sludge conditioning zones 4 and for discharging excess sludge from the sludge conditioning zones 4.

In operation, the wastewater influent is fed into the reaction zone 1 via line 9. Conditioned sludge is fed from one of the multiple sludge conditioning zones 4 (or from a sole conditioning zone) in the reaction zone 1 by one of the pumps 32, via lines 213. Sludge and wastewater in the reaction zone 1 are mixed by either gases generated in the reaction zone and in the sludge conditioning zones 4, or by a mixing device (propeller mixer, circulating pump, gaslift, etc.). The gases generated in the apparatus will flow up in the gas bell 33 to be evacuated via the pipe 34. A portion of the sludge in the mixed liquor in the reaction zone 1 settles down into the sludge conditioning zones 4. The remaining sludge is discharged through the pipe 10 with the mixed liquor from the reaction zone 1 to a sludge separation device; and, after separation from the treated water the sludge is returned to a sludge conditioning zone 4. Sludge in the conditioning zones 4 is continuously or periodically mixed by mixing devices. Circulation pumps 32 and lines 213 and 31 are one example of mixing means. Alternatively, a propeller mixer, or a jet pump can be used. A mixing device in the sludge conditioning zone in a combined structure as shown in FIG. 8 should not produce significant uncontrollable sludge transfer from the sludge conditioning zones 4 to the anaerobic reaction zone 1. Periodically or continuously, a portion of the conditioned sludge is discharged from the system via line 14. Various previously described reagents, powdered activated carbon, liquid and solid organics can be fed into the system either with the wastewater influent via line 9, or through lines 13 with the sludge return after the sludge separator.

Optionally, the upper reaction zone 1 is separated into multiple compartments by extended upward walls 36. Each reaction compartment is associated with the fixed sludge conditioning zones. For example, a total of two reaction zones are associated with eight conditioning zones, four conditioning zones per reaction zone. The groups of reaction and conditioning zones are connected sequentially, and counterflow of sludge is provided as previously described.

Figure 12:
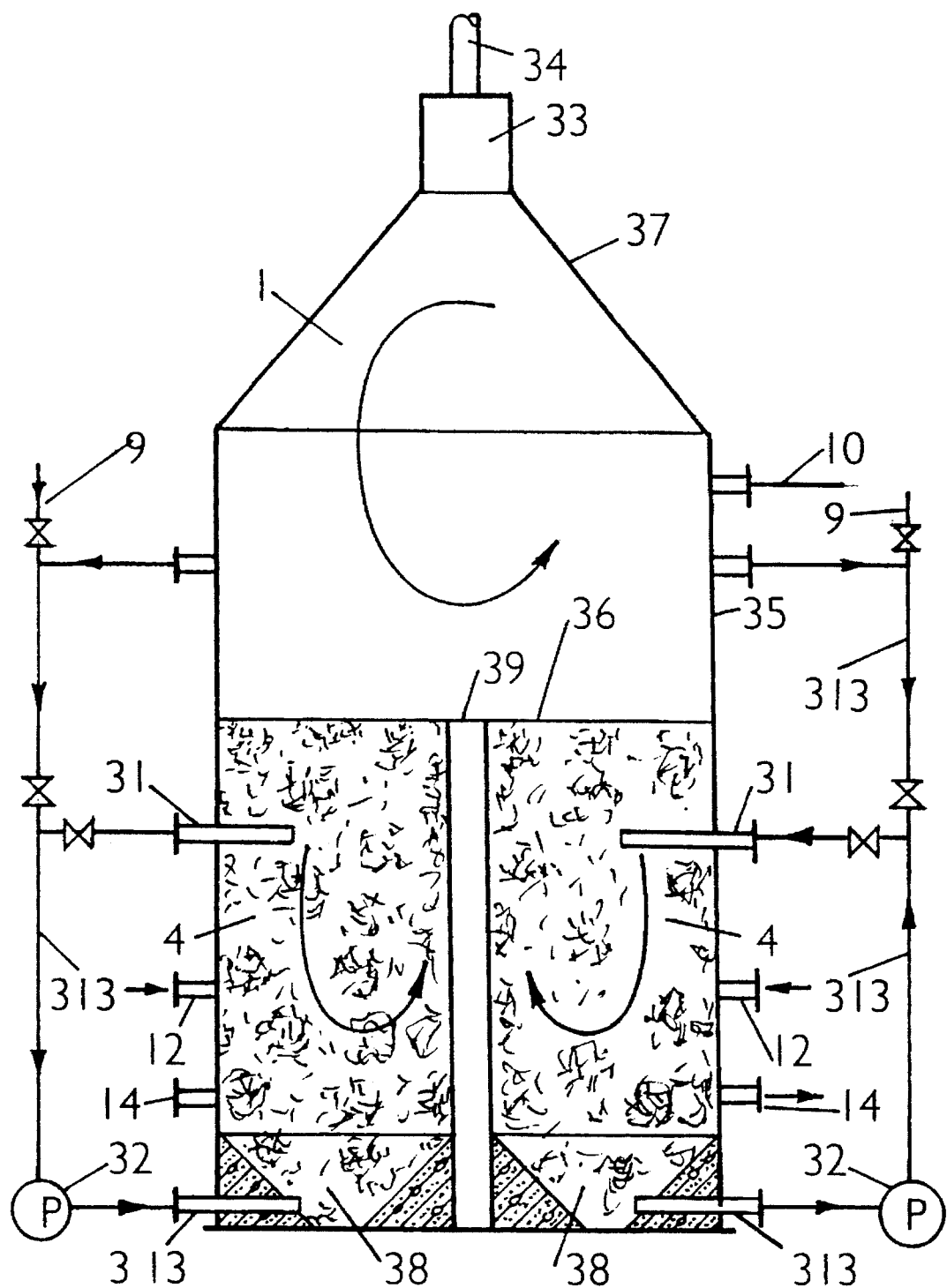
FIG. 12 is a vertical cross-sectional view similar to FIG. 8 and showing a modification thereof.

Referring to FIG. 12, there is shown an alternative combined structure for anaerobic reactor and sludge conditioner. This structure is similar to the above described arrangement, but with a few changes.

Lines 9 for wastewater influent and 10 for the anaerobic mixed liquor are connected to the sludge circulation pipes 313 and 31. Pipes 313 and pumps 32 are provided for moving the sludge between the sludge conditioning zones 4 and the reactor zone 1. Pipes 12 and 14 are provided for feeding the sludge from a sludge separator to the sludge conditioning zones 4 and for discharging the excess sludge.

In this arrangement, the wastewater influent is fed via lines 9, and 313. Circulation may be assisted in the selected sludge conditioning zone 4 by the pump 32; and, such circluation assists also in the reaction zone 1. A suspended sludge blanket is formed in the selected sludge conditioning zone 4, and for the period of selection the selected sludge conditioning zone becomes a part of the reaction zone. Sludge and wastewater in the reaction zone 1, and the selected sludge conditioning zone 4, are kept in the fluidized state by the use of the pump 32, and additionally mixed by gases generated in the reaction zone 1 and in the sludge conditioning zones 4. The gases generated in the apparatus flow up into the gas bell 33 and are evacuated via pipe 34. A portion of the sludge in the mixed liquor in the reaction zone 1 settles down into the sludge conditioning zones 4 which are not selected at the time. The remaining sludge is discharged with the mixed liquor from the reaction zone 1 to a sludge separation device through the pipe 10, and after separation from the treated water is returned to a sludge conditioning zone 4. Sludge in the conditioning zones 4 is mixed as was discussed above.

Figure 13:
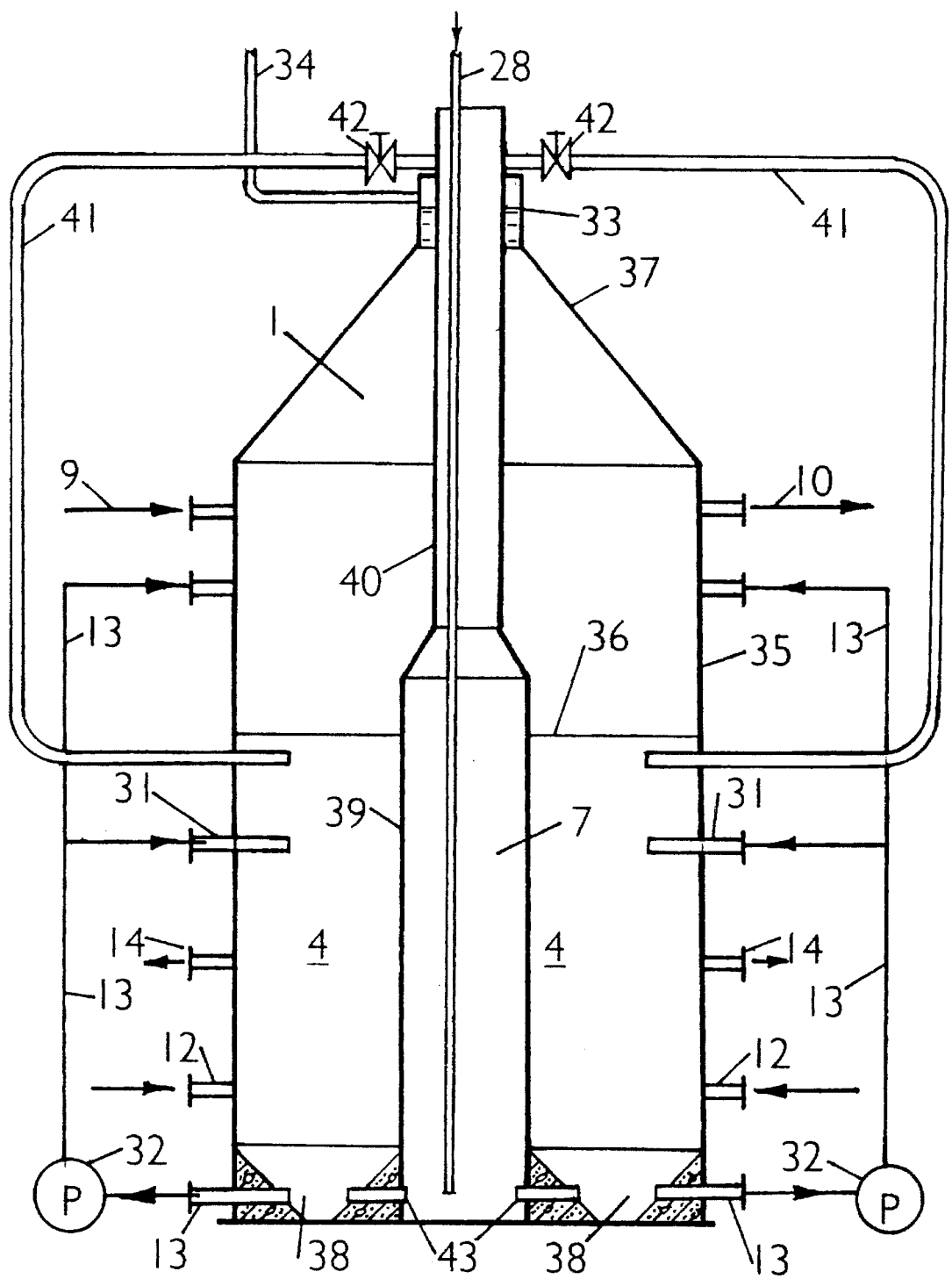
FIG. 13 is a vertical cross-sectional view showing another modification of the structure shown in FIG. 8.

Referring next to FIG. 13, there is shown another variation of the combined structure for anaerobic reactor and sludge conditioner. Again, the structure is similar to that shown in FIG. 8, but with some changes.

In FIG. 13, there is an enlarged central connection element 39 with an extension section 40 protruding through the gas collection section 33. The volume inside the element 39 and extension section 40 comprise the aerobic section 7 of the sludge conditioner. Section 7 is provided with a pipe axially thereof 28 for air, or oxygen, or oxygen enriched air. Pyramidal bottom 38 is provided in each sludge conditioning compartment. Each compartment is provided with pipes 13 and 31 and a pump 32 as means for sludge mixing, and also with pipes 43 for transferring the anaerobic sludge to the aerobic sludge conditioning section 7. Pipes 41 with valves 42 connect the upper part of the aerobic section 7 with each anaerobic section 4.

Lines 9 for wastewater influent and 10 for the anaerobic mixed liquor are provided in the upper part of the structure. Pipes 13 and pumps 32 are provided for moving the sludge between the sludge conditioning zones 4 and the reactor zone 1. Pipes 12 and 14 are provided for feeding the sludge from a sludge separator to the sludge conditioning zones and for discharging the excess sludge from the sludge conditioning zones.

It will be understood that most of the operation of this embodiment is the same as the embodiment shown in FIG. 12, so the description will not be repeated. The difference, however, is that a portion of the sludge in a selected sludge conditioning zone 4 is transferred via pipe 43 into the aerobic sludge conditioning zone 7 and aerated with air, or oxygen, or oxygen-enriched air supplied through the pipe 28. Aerobically treated and heated sludge is transferred back to the selected zone 4 by opening a valve 42 on line 41. Various lifting means can be used for transferring the sludge between the selected anaerobic zone 4 and the aerobic zone 7. In FIG. 13, the transferring means is an airlift, which also accomplishes the aeration in the central well 39 and the standpipe 40. Alternatively, a pump can be used for the sludge transfer between zones 4 and 7.

Since sulfides are oxidized into sulfates in the aerobic zone 7, heavy metals become soluble. They can be removed from the system with a small amount of water by removing a portion of water from the aerobic sludge. Metals can be reduced to an even smaller volume by using known methods, and water virtually free of metals may be returned to the water train. Periodically or continuously, a portion of the conditioned sludge is discharged from the system via line 14. Various previously described reagents, powdered activated carbon, or liquid and solid organics can be fed into the system either with the wastewater influent via line 9, or through lines 13 with the sludge return after the sludge separator.

An alternative operation of this apparatus with all baffles 36 extended upward and inside the gas collection means 33 can be as follows: some "total height" zones will be operated at maximum flow while others are operated at reduced flow or zero flow. All zones are operated in parallel as separate reactors with the time clock change in sequencing of the sections operated at maximum, reduced and zero flows. Sludge in sections with less than maximum flow is being conditioned.

Figure 14:
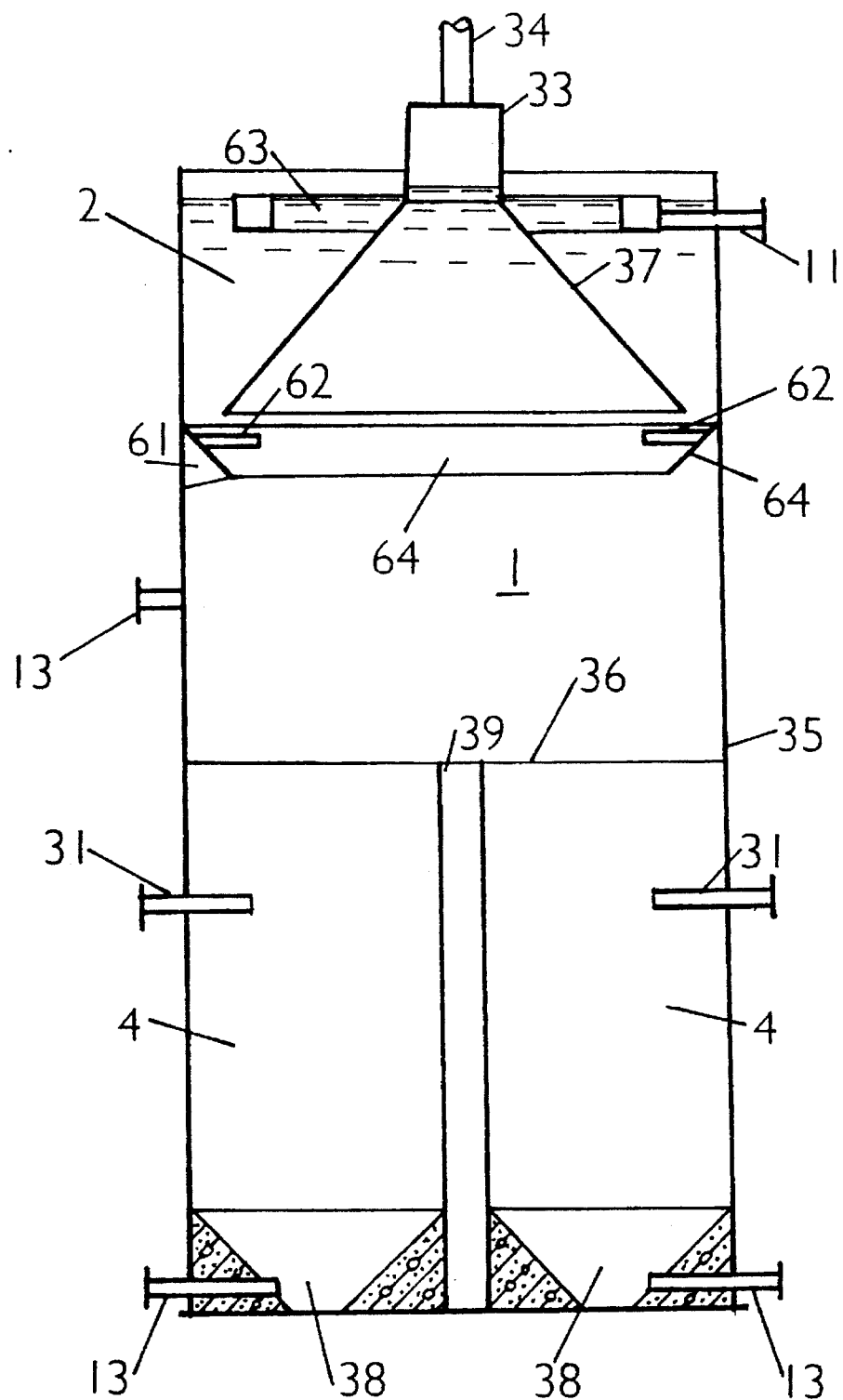
FIG. 14 is a vertical cross-sectional view showing yet another modification of the structure shown in FIG. 8.

Another variation of the combined structure is shown in FIG. 14. Again, the shape may be as shown in FIGS. 9, 10 or 11 and discussed above. In this embodiment of the invention, the outer shell 35 of the structure is extended upward to a level above the liquid level in the gas collection section 33. The space above the cone 37, separated by the extended shell 35, houses the sludge separation zone 2. The base of the top cone 37 has a diameter smaller than the diameter of the outer shell 35 so that a circular opening 64 is formed between the top cone 37 and the shell 35. An inclined circular baffle 61 is provided for gas collection in the inner space along the structure shell 35. Gas pipes 62 connect the gas space under the baffle 64 with the gas space under the cone 37. A water collection trough 63 with an influent pipe 11 is positioned at the water level in the sludge separation zone 60.

The lower portions of the device are the same as in FIG. 8, and the description will not be repeated.

In operation of this embodiment, the wastewater influent is fed into the reaction zone 1 via line 9. Conditioned sludge is fed from one of the sludge conditioning zones 4 in the reaction zone 1 by one of pumps 32 via lines 213. Sludge and wastewater in the reaction zone 1 are mixed by either gases generated in the reaction zone and in the sludge conditioning zones 4, or by a mixing device such as a propeller mixer, circulating pump, gaslift, etc. The gases generated in the apparatus will flow up into the gas bell 33 and will be evacuated via pipe 34. Gases collected under the baffle 61 are directed beneath the cone 37 by pipes 62. A portion of the sludge in the mixed liquor in the reaction zone 1 settles down into the sludge conditioning zones 4. The remaining sludge is discharged with the mixed liquor from the reaction zone 1 to a sludge separation zone 2 through the opening 64; and, after separation from the treated water, is returned through the same opening 64, back to the anaerobic reaction zone 1 and ultimately to the sludge conditioning zones 4. The gravity-clarified water in the sludge separation zone 2 is collected in the trough 63 and discharged from the system via pipe 11. Scum removal means, means for forced sludge transfer to the sludge conditioning zones 4 instead of the reaction zone 1, and other available options may be provided. Sludge in the conditioning zones 4 is continuously or periodically (for example, on a time clock basis) mixed by mixing devices such as the circulation pumps 32 and lines 213 and 31. Alternatively, a propeller mixer, or a jet pump can be used. A mixing device in the sludge conditioning zone in a combined structure as shown in FIG. 14 should not produce significant, uncontrollable sludge transfer from the sludge conditioning zones 4 to the anaerobic reaction zone 1. Periodically or continuously, a portion of the conditioned sludge is discharged from the system via line 14. Various previously described reagents, powdered activated carbon, or liquid and solid organics can be fed in the system either with the wastewater influent via line 9, or through lines 13 with the sludge return after the sludge separator.

Figure 15:
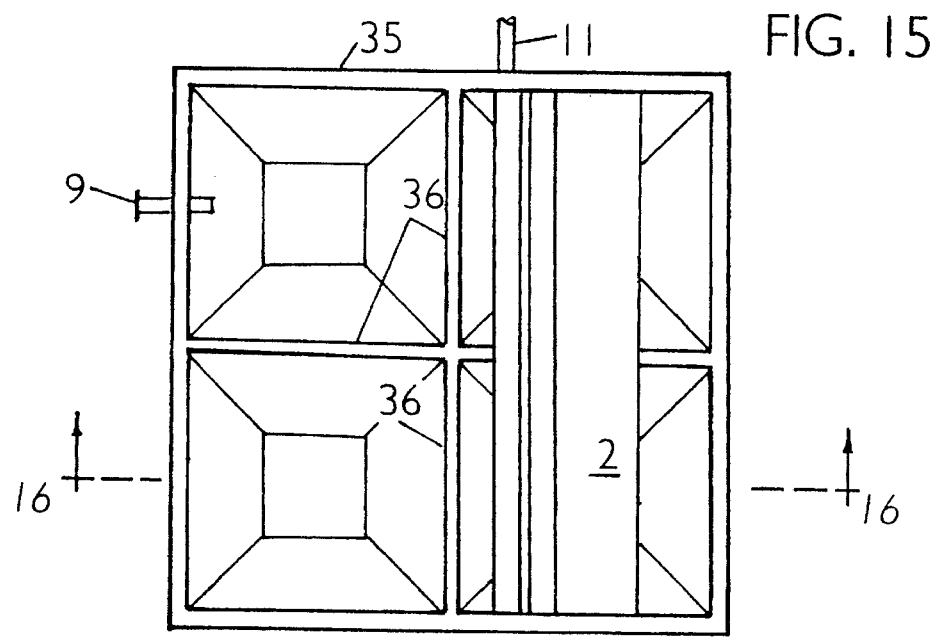
FIG. 15 is a top plan view of an open structure for use in the present invention.
Figure 16:
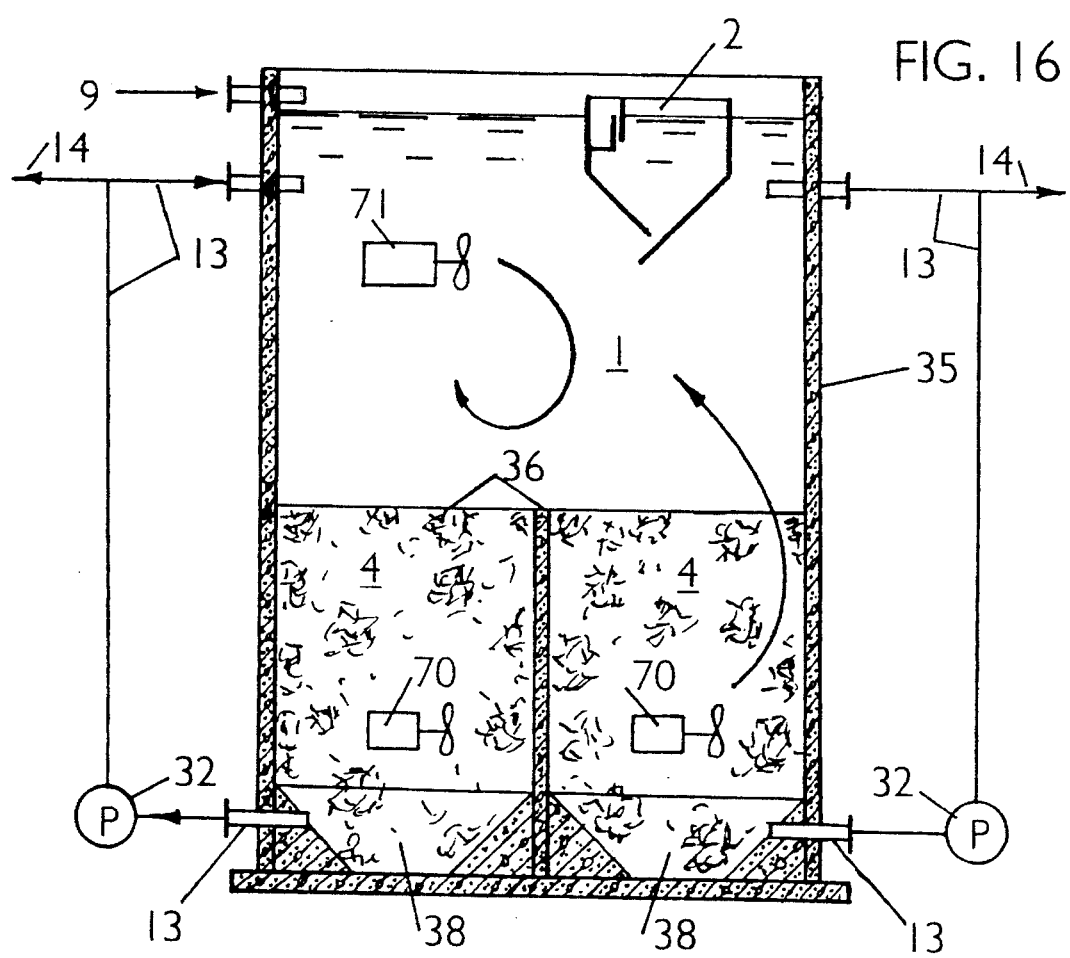
FIG. 16 is a cross-sectional view taken along the line 16—16 in FIG. 15.

Referring now to FIGS. 15 and 16, there is shown a combined open structure for wastewater treatment, sludge separation and conditioning. The structure consists of a rectangular tank formed by outer walls 35, and having internal partitions 36 extended for a fraction of the total tank height. These partitions 36 form multiple sludge conditioning compartments 4, each compartment having a pyramid bottom 38.

The tank volume above the level of partitions 36 houses the anaerobic reactor 1. A sludge separating means 2, in the form of a settling trough is disposed in the reactor volume. Pipes 9 and 11 are provided for wastewater influent and for treated wastewater respectively. Means 70 for mixing sludge is in each sludge conditioning compartment 4, and means 71 for mixing the anaerobic mixed liquor is in the reactor area 1. As here shown, the means 70 and 71 are submersible mixers. The structure also includes means for transferring the conditioned sludge from each sludge conditioning compartment 4 to the reactor zone 1, for example a pump 32 and pipes 13. Pipes 14 are provided for discharging the excess sludge from the sludge conditioning zones.

In the operation of this embodiment, wastewater influent is fed into the anaerobic reaction zone by pipeline 9, the sludge is fed in the anaerobic reaction zone 1 by the pump 32 via pipes 213 from a selected sludge conditioning compartment 4. The liquid in the anaerobic reaction zone is mixed by the gases generated in the reaction and sludge conditioning zones, and also by the mixing device 71. The mixtures including the wastewater undergo transformations as previously described. The gases leave the anaerobic reaction zone through the open top of the apparatus. Appropriate sludge conditioning results in: (a) a sufficiently high pH in the reaction zone (near neutral to slightly alkalinic) so that hydrogen sulfide is substantially dissociated into nonvolatile ions; and, (b) a low content of volatile fatty acids and other odorous compounds in the mixed liquor, so that the gases leaving the anaerobic reactor are composed mainly of nonodorous methane and carbon dioxide.

The mixed liquor is transferred into a sludge separation means 2, such as a settling trough, a clarifier, a centrifuge, or a filtration device. Two possible sludge separation devices are described later. The clarified water after the sludge separation device 2 is evacuated from the anaerobic system, while the sludge is returned in the anaerobic reaction zone 1 and eventually in the sludge conditioning zones 4. The sludge in the sludge conditioning zones undergoes transformations as previously described. A sludge mixing means is provided in each sludge conditioning zone. It can be a circulation pump, a propeller mixer (mixer 70 in FIG. 16), or the like. Addition of the necessary reagents, powdered activated carbon, liquid or solid organics, etc. as previously described, can be provided. The excess sludge can be discharged via pipes 14.

Figure 17:
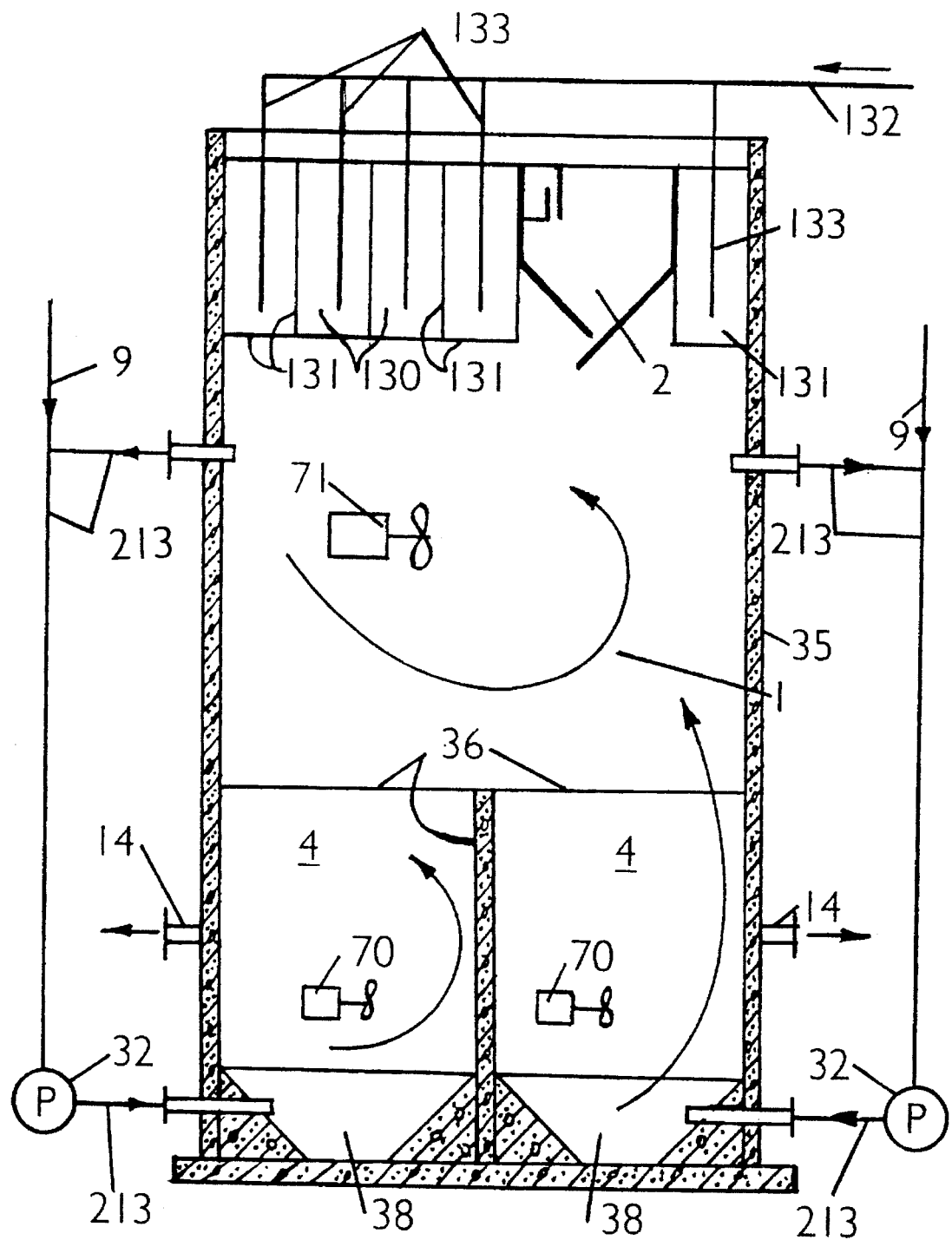
FIG. 17 is a vertical cross-sectional view showing a modification of the device shown in FIG. 16.

FIG. 17 illustrates a variation of the structure shown in FIG. 16. The difference in FIG. 17 is the provision of aeration compartments 130 over the entire open surface of the open anaerobic structure. These aeration compartments 13 are formed by an array of vertical baffles 131, with air supplied to the compartments via main 132, and distribution lines 133. Alternatively, compartments 130 can be formed by inclined submerged baffles as described in the U.S. Pat. No 4,472,358.

Thus, the embodiment shown in FIG. 17 is similar to the device of FIG. 16, and the operation is similar. The difference in the embodiment of FIG. 17 is that further elimination of odorous gases is achieved by the use of the aerated compartments 130 supplied with air via pipe 132 and air distribution branches 133. Aeration causes propagation of the aerobic and facultative organisms which consume residual odorous organics and oxidize hydrogen sulfide.

The mixed liquor is transferred from the anaerobic reaction zone into a sludge separation means 2, such as a settling trough, a clarifier, a centrifuge, or a filtration device. After the sludge separation device 2, the clarified water is evacuated from the anaerobic system, while the sludge is returned to the anaerobic reaction zone 1, and eventually to the sludge conditioning zones 4.

The balance of the operation is like the embodiment of FIG. 16, and will not be repeated.

Figure 18:
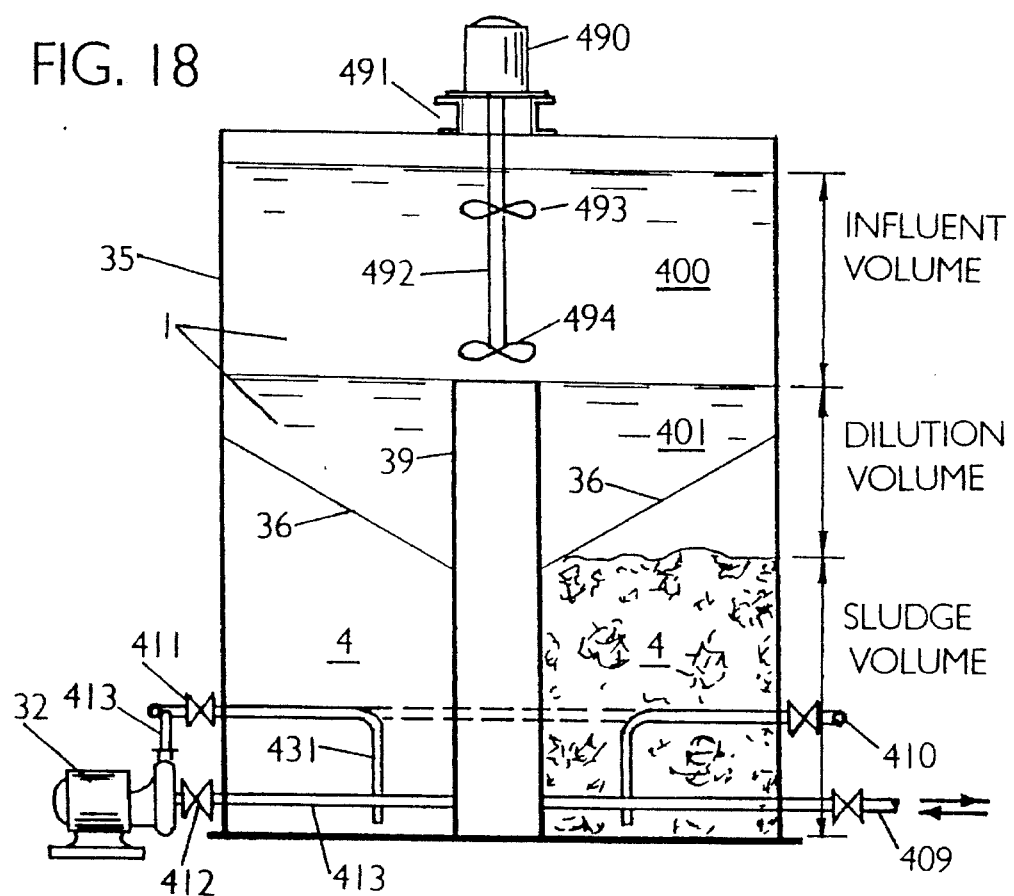
FIG. 18 is a cross-sectional view of a sequence batch reactor taken along the line 18—18 in FIG. 19.
Figure 19:
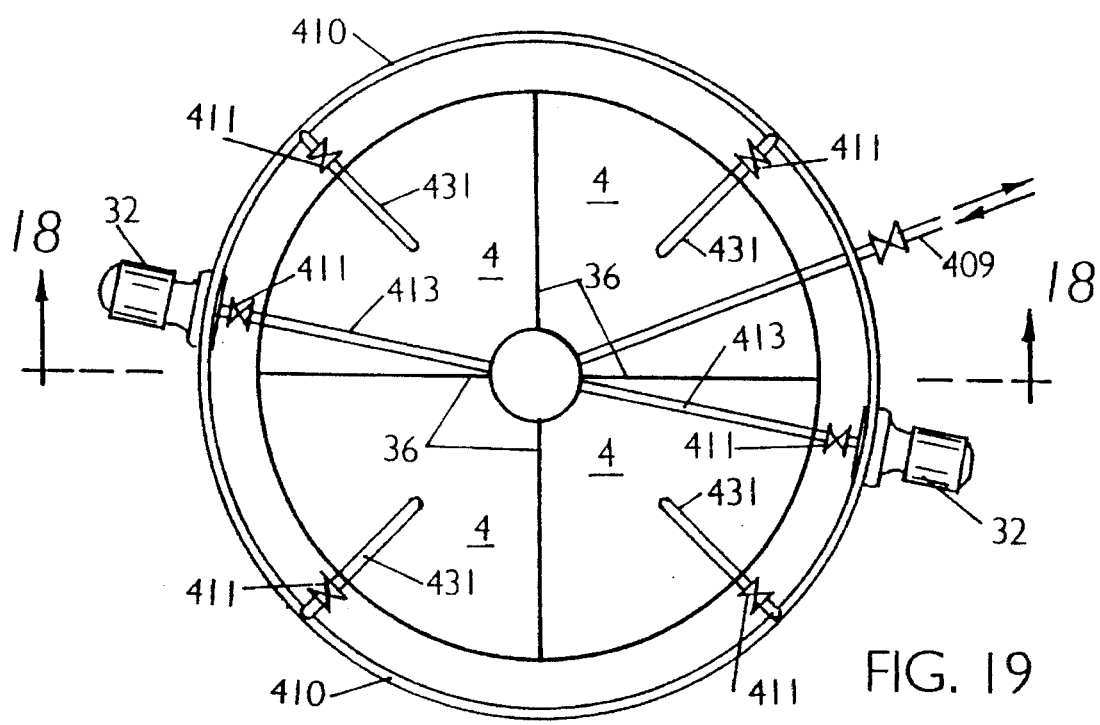
FIG. 19 is a top plan view of an open structure of a sequencing batch reactor showing a modification of the device illustrated in FIG. 18.

A sequencing batch reactor is shown in FIGS. 18 and 19. It consists of the outer shell 35 housing the reaction zone which is subdivided into volumes of influent 400 and dilution 401, and the sludge conditioner consisting of multiple chambers 4 formed by the central pipe 39 and radial baffles 36. A bladed mixer 490 is supported by a structure 491, the mixer having a shaft 492 carrying one or more sets of mixer blades 493 and 494. A circulation and mixing pump 32, with pipes 410, 413, and 431, and valves 411, 412, is provided. Pipe 409 for feeding influent and discharging effluent is connected to the central pipe 39.

The apparatus is operated as follows: At the beginning of the cycle, the liquid level is at the top of the dilution level. Gradually, influent fed through pipe 409 fills the influent volume 400. During the filling step, sludge from a selected compartment 4 is mixed with wastewater using pump 32, and piping and valving, and also the mixer 490. Mixing continues until the wastewater is sufficiently treated. This can be determined by chemical analyses or through measuring gas production intensity. After that, all mixing is stopped and sludge is allowed to settle below the influent volume. The influent volume is decanted via the central pipe 39 and pipe 409. After that, the cycle is repeated. Accordingly, all steps of treating wastewater are sequential, while the sludge in the nonselected compartments 4 is conditioned in parallel (i.e. simulataneously) with the wastewater treatment.

The diluting volume serves to reduce the occasional high concentrations of toxic slugs in the influent, thereby avoiding sludge poisoning and insuring adequate treatment.

Figure 20:
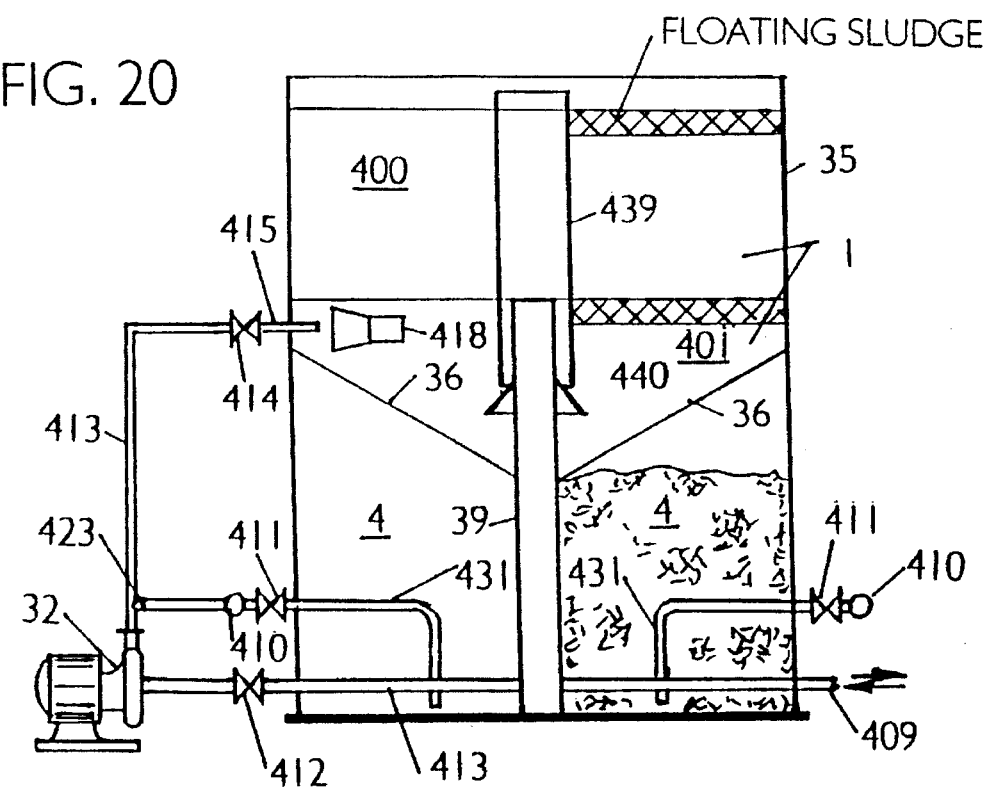
FIG. 20 is another modification of the structure shown in FIG. 18.

The apparatus shown in FIG. 20 differs from that shown in FIGS. 18 and 19 by the casing 439 installed around and above the central pipe 39, by the gas deflecting cone 440 placed under the casing 439, and also by the use of an injection mixer 418 provided with pipe 415 and valve 414.

The operation of this apparatus is also similar to that described for FIGS. 18 and 19. The provision of the casing 439 and cone 440 helps to avoid drafting of the floating sludge into the effluent as it descends from the upper to the lower position. It also reduces gas mixing effect on the settling sludge because the gas passage in the casing 439 and the central pipe 39 are excluded. Optionally, the space between the central pipe 39 and the casing 439 serves as a suspended sludge blanket clarifier Accordingly, it separates clarified water from sludge particles entering this space through a slot between the cone 440 and the casing 439. The clarification option requires that the upflow velocity in the said space is low and limited to the settling velocity of sludge particles in the sludge blanket.

Figure 21:
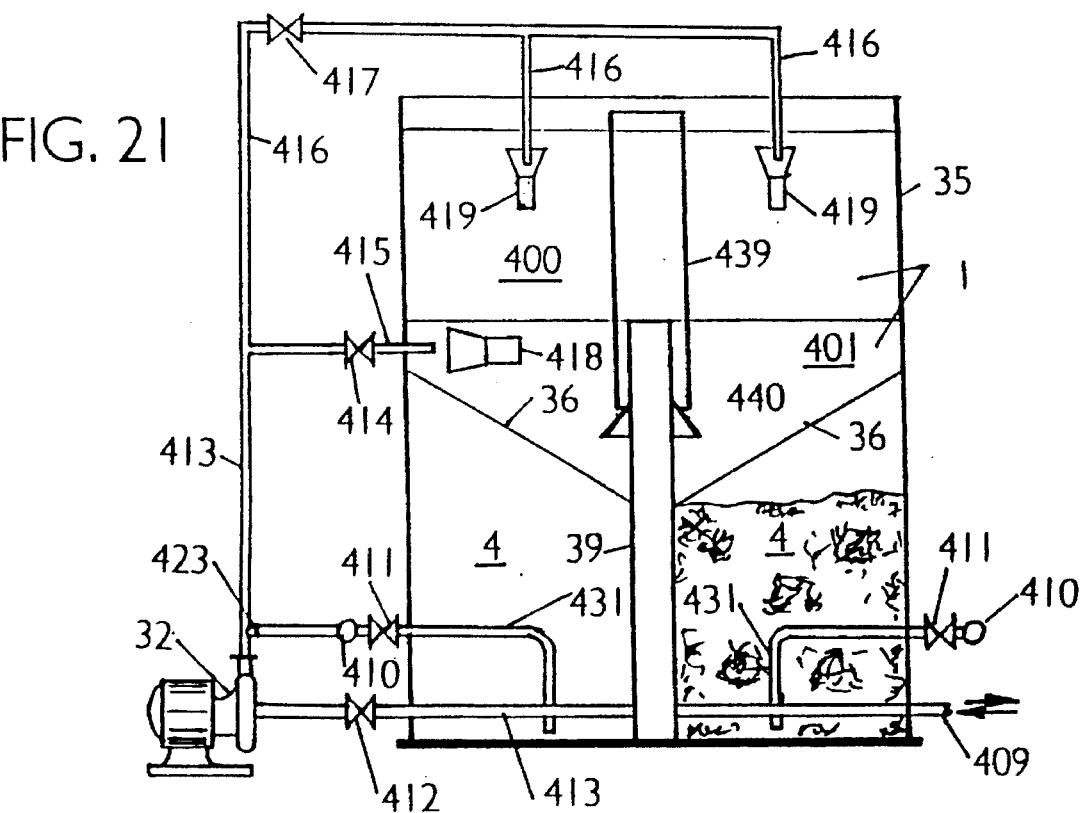
FIG. 21 is yet another improvement of the structure shown in FIG. 18.

The apparatus shown in FIG. 21 is a further improvement of apparatus shown in FIG. 20 by using additional injection mixers 419 at the top of the reactor, provided with pipes 416 and a valve 417. Operation of injectors 419 allows for degassing and sinking of the floating and buoyant sludge. Accordingly, the effluent carries out less suspended solids.

Figure 22:
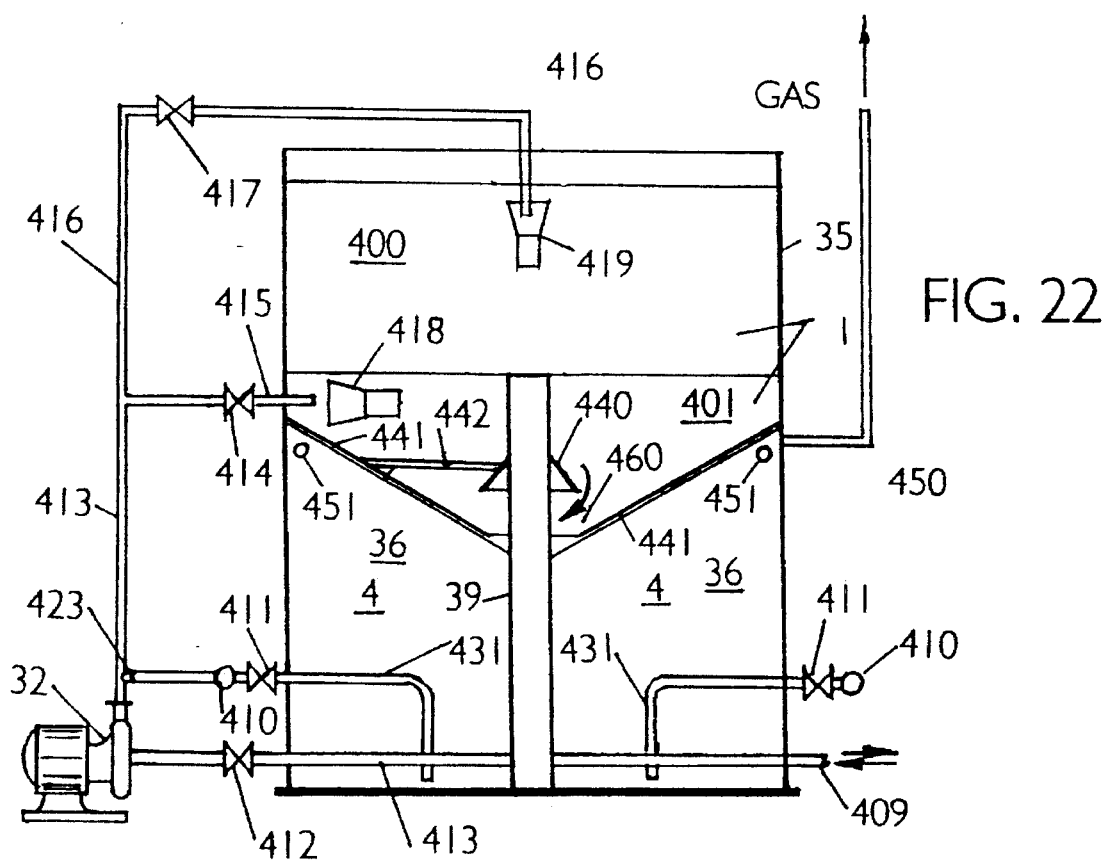
FIG. 22 is another alternative of the sequencing batch reactor.

The embodiment shown in FIG. 22 is yet another improvement of the apparatus shown in FIGS. 18 and 19. It has a cone 440 around the central pipe 440 and a cone 441 formed by a plate covering the peripheral section of compartments 4. Baffles 36 are provided with gas openings 451. An upper section of the cone 440 is connected to the cone 441 by a gas pipe 442. A gas removal pipe 450 is connected to the upper section of cone 441. A slot 460 is formed between cones 440 and 441 allowing the sludge to settle into compartments 4 and excluding gas flow from these compartments into the reaction/sludge separation zone.

In the course of operation, a portion of the gas generated in sludge conditioning compartments 4 is collected under cones 440 and 441, and is evacuated by pipes 442 and 450. At the end of the cycle, sludge is degassed in the reaction zone by mixers and settles into the sludge compartments 4. Accordingly, the decanted effluent is better clarified.

Figure 23:
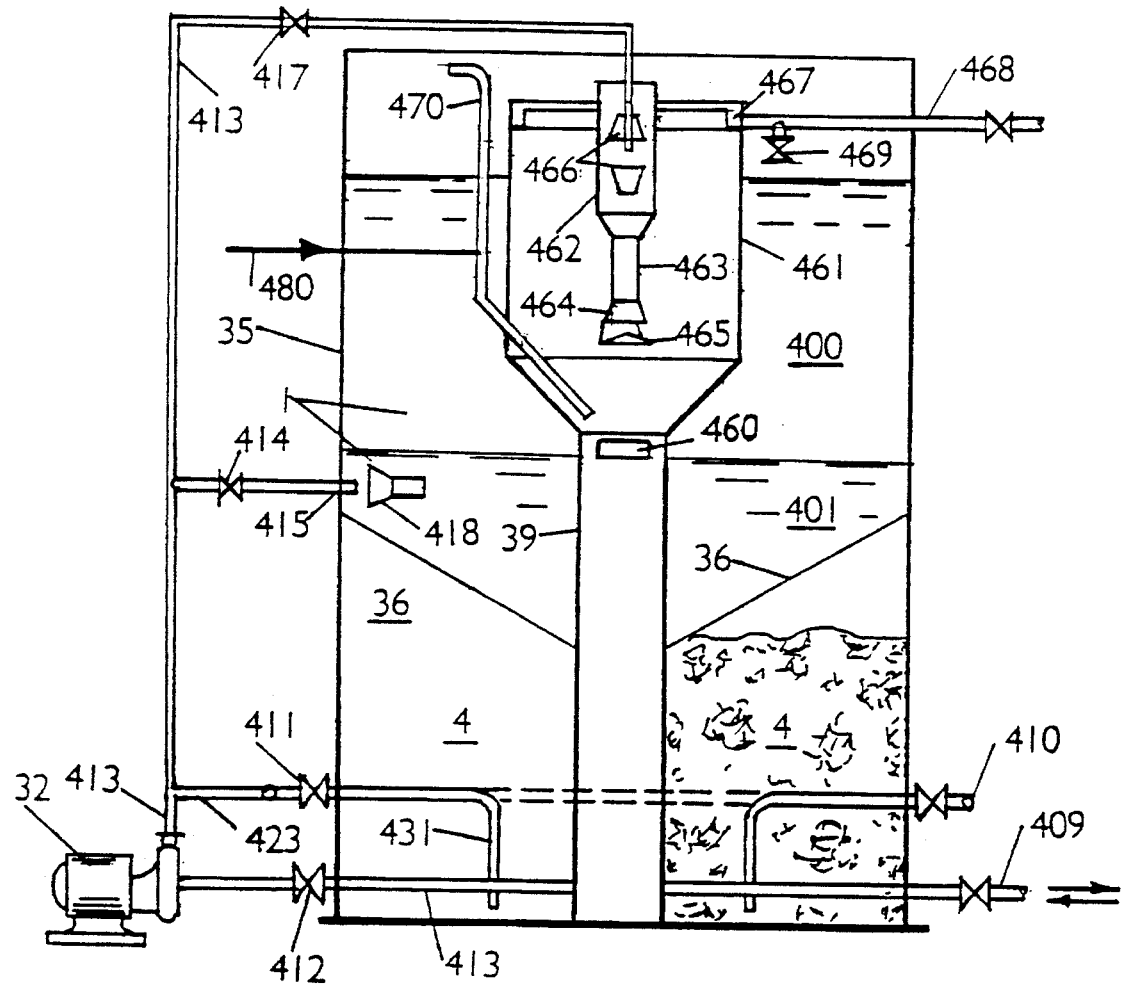

FIG. 23 illustrates a sequencing batch reactor similar to that shown in FIGS. 18, 19 and 20, and is provided with a built-in degassing and settling tank 461. The settling tank 461 is provided with a central degassing/water distribution unit comprising a wider section 462 with circulation cones 466 (see U.S. Pat. No. 4,472,358) and pipe 413, a narrower section 463 with water distribution cones 464 and 465, with a circular trough 467 for collecting clarified water with pipes 468 and 469 for effluent discharge and recirculation, with a sludge airlift 470 and air pipe 480. The weight of settling tank 461 is supported by structure 460 on top of the central pipe 39.

The system operates as follows: The influent is gradually added from the minimum water level to the maximum water level. Pump 32 mixes, and circulates the sludge and waste water from the selected sludge compartment 4 to the reaction zones 400 and 401 via pipes 413 and 415 and injection device 418 and also via settling tank 461. In the wider section 462, due to turbulence and circulation around the cones 466, sludge is degassed. The clarified water from the settling tank is recycled in the reaction zone through line 469, and separated sludge is returned to the reaction zone by airlift 470. When a batch of waste water is adequately treated, line 469 is closed and line 468 is opened to discharge the treated clarified effluent. When the water level drops to the minimum level, the cycle is repeated.

Figure 24:
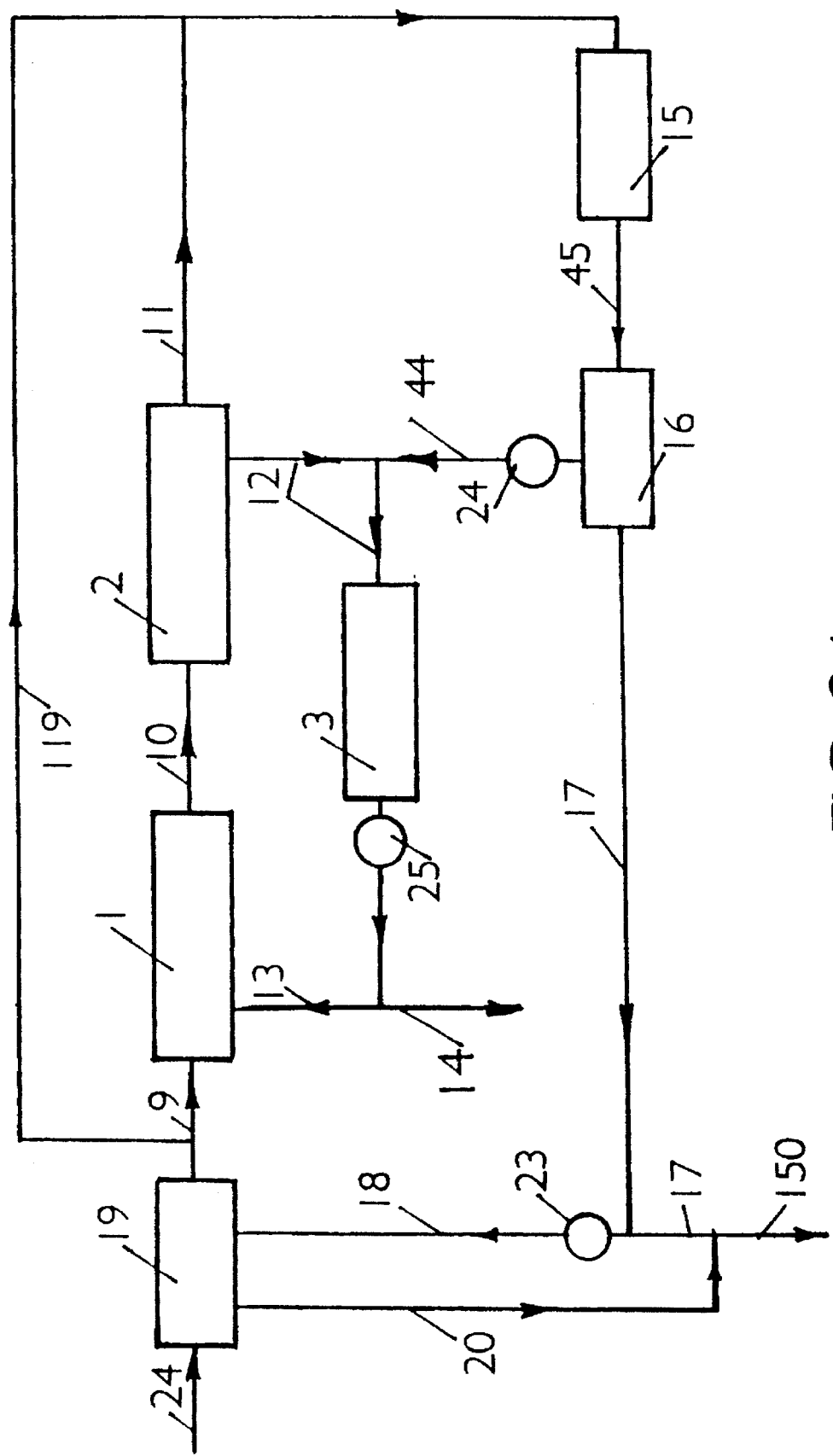
FIG. 24 is a flow chart showing a wastewater treatment plant including both an anaerobic treatment stage and an aerobic treatment stage.

The embodiment of the invention shown in FIG. 24 includes an anaerobic reactor 1, the output of which is directed by pipe 10 to a sludge separator 2. The sludge from the sludge separator 2 passes through the pipe 12 and into the sludge conditioner 3, while the liquid effluent goes through the pipe 11 and into the aerobic reactor 15. The discharge from the aerobic reactor 15 is directed to the sludge separator 16.

The discharge from the sludge separator 16 includes the aerobic sludge, which is moved by the pump 24 through the pipe 44 and into the sludge conditioner 3. The liquid effluent passes through the pipe 17 from which it may be discharged to the environment, or at least partially directed to the anaerobic reactor 1 to be recycled.

The advantages of utilizing an aerobic reactor in combination with an anaerobic reactor have been discussed above, and need not be repeated. It should be noticed, however, that there is a by-pass line 119 to allow the influent from the line 21 to be directed immediately to the aerobic reactor in order to generate a greater quantity of aerobic sludge.

The additional novel feature of the apparatus shown in FIG. 24 is the use of the fluid flow control box 19. Briefly, the influent from the line 21 enters the box 19, and is discharged through the line 9. Recycled material from the sludge separator 16 enters the box 19 from the pipe 18, and excess liquid is discharged through the line 20. There is a nearly constant flow from the box 19 through the pipe 9, so the entire system can be maintained with substantially constant flow.

The flow control box 19 is shown in more detail in FIGS. 25–27, and it will be seen that there is a body including a large compartment 106 and a smaller, side compartment 105. There is a common wall 100 between the compartments 106 and 105, and the upper edge defines a notch 102 which acts as a wier. The box 19 also includes an end compartment 107. The compartment 107 adjoins the compartment 106, and is separated therefrom by a baffle 104. The baffle 104 does not extend all the way to the bottom of the compartments, so fluid flow is allowed between the two compartments through the passage 109. A side wall of the compartment 107 defines an opening 101 which is narrow, but extends down a substantial distance.

In operation, therefore, the wastewater influent is fed into the compartment 107 via pipe 21. The wastewater flow rate Q varies from $Q_{min}$ to $Q_{max}$. A recycle flow, $Q_r = Q_{max} - Q_{min} =$ Constant, is fed into the compartment 106 from the line 18. From the compartment 106, a portion of the recycle flow is transferred under the baffle 104 through the passage 109 and merges with the flow Q of the influent. The balance of the flow $Q_r$ overflows the broad weir 102 and flows into the compartment 105, then into the pipe 20. The influent Q and recyclate from the line 18 flow through the opening 101. This combined flow may go in line 9 (FIG. 24).

The use of a broad opening as the wier 102 provides nearly constant water level in the compartments 106 and 107; therefore, a nearly constant flow rate is provided across the opening 101. This is advantageous from the operations standpoint.

Figure 28:
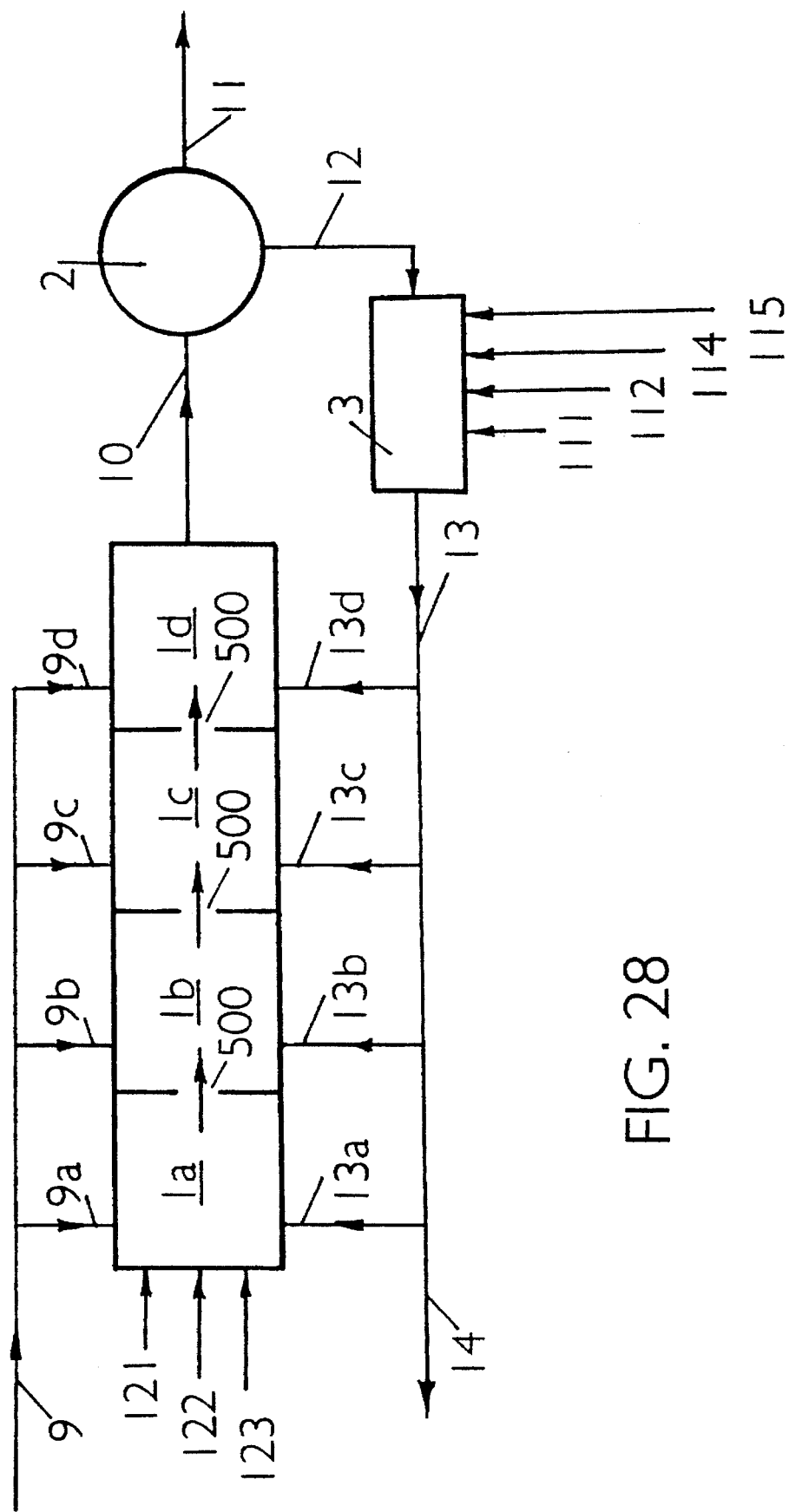
FIG. 28 is a flow chart showing an anaerobic block with a reactor comprising multiple sequential cells.

A further modification of the anaerobic apparatus, shown as a portion of the system in FIG. 24, is the use of the multiple cell anaerobic reactor 1 as illustrated in FIG. 28. This reactor comprises multiple sequential reactors 1a, 1b, 1c, and 1d, having one-way passages 500 for mixture of wastewater and sludge. The influent distribution piping 9, 9a, 9b, 9c, 9d is connected to each cell 1a, 1b, 1c, 1d. Lines for feeding reagents 121, 122, 123, for example, nutrients, PAC, neutralization chemicals, sulfur bearing substances, etc., are connected to cell 1a. Optionally, reagents can be supplied in any or all cells. Line 10 connects the last reactor cell 1d with the sludge separator 2. Sludge conditioner 3 is provided with the feed line 12 and the conditioned sludge line 13 branching into lines 13a, 13b, 13c, and 13d, each connected to an individual reactor cell 1a, 1b, 1c, and 1d. Lines 111, 112, 113, 114, 115 for feeding various reagents to the sludge conditioner are also provided.

Apparatus shown in FIG. 28 can be adapted to various modes of operation. For example, it can be optimized to treat time variable organic loading by distributing unequal fractions of influent cells 1a, 1b, 1c, 1d and produce equalized effluent. Or, it can be optimized to minimize the reactor volume by providing distributed feed of influent and/or conditioned sludge among cells 1a, 1b, 1c, 1d. Alternatively, cells may be used for different functions. For example, the entire influent may be fed into cell 1a with no, or very little, feed of the conditioned sludge into this cell. Then, cell 1a becomes an acidification step. The following cells, 1b, 1c, 1d may be fed with the conditioned sludge to be operated in a methanogenic regime. Accordingly, such a reactor affords flexibility of operation.

Figure 29:
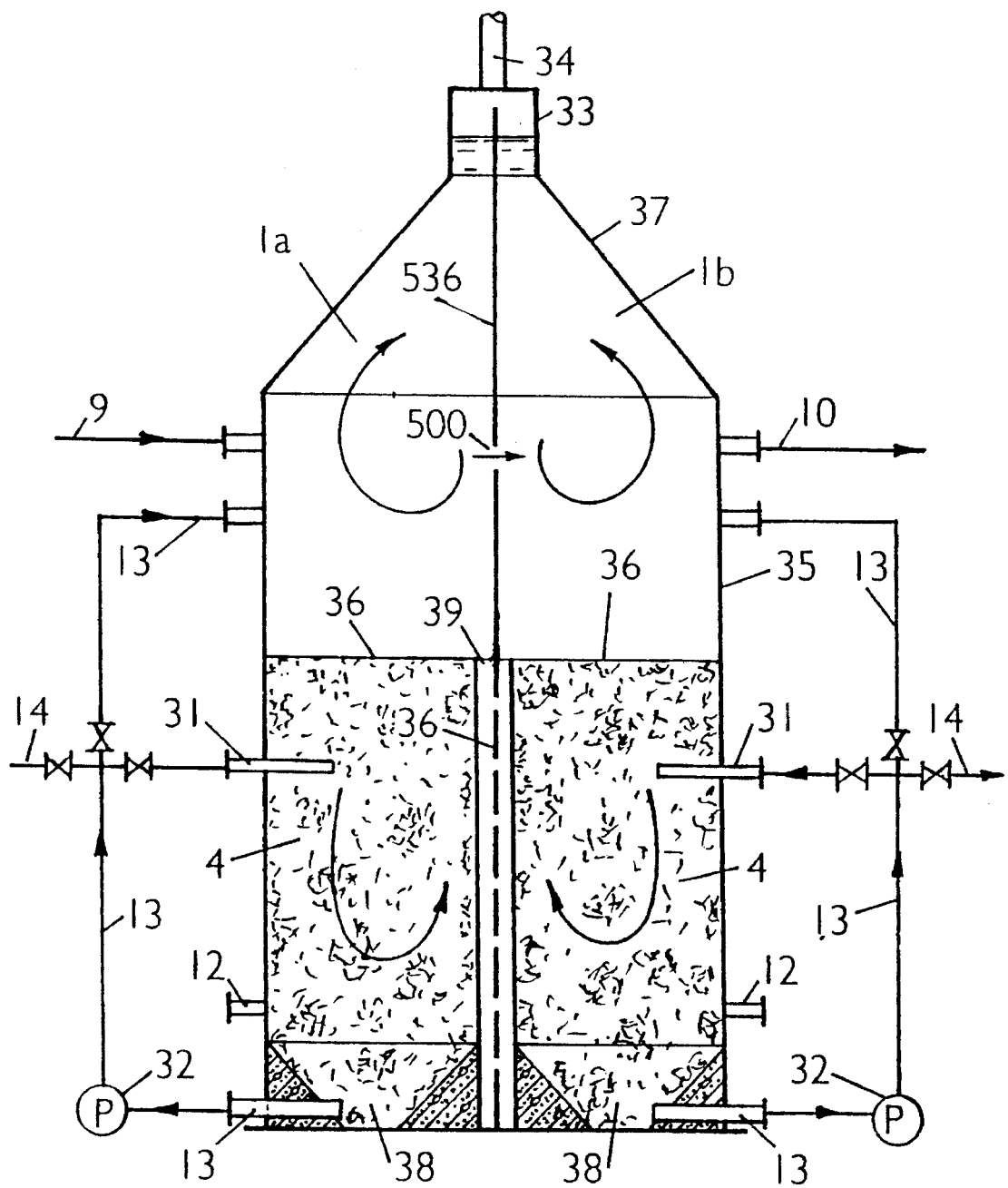
FIG. 29 is a cross-section of a reactor with multiple sludge compartments and multiple reactor cells.

FIG. 29 is an example of a reactor with multiple sludge compartments 4 and multiple reactor cells 1a and 1b. This structure is similar to FIG. 8 and differs only by extending some or all baffles 36 upward using extensions 536. These extensions go into the gas collection section 33, and divide the total reaction space into multiple cells. One-way passages 500 are provided in the extension baffles 536. The apparatus is operated as a sequence of cells in the embodiment shown in FIG. 28. Optionally, sludge conditioning compartments located under a given reaction cell can be used in conjunction with another (not overlying) reaction cell.

Referring now to that embodiment of the invention shown in FIG. 30, there is an aerobic reactor 202 with the influent conduit 201, and a line 203 for supplying an oxidizer, an optional line 204 for feeding nitrates, nitrites or other source of nitrogen (e.g. urea), a line 205 connecting the reactor 202 to an anaerobic reactor 207, an optional line 206 for feeding nitrates or nitrites into reactor 207 (or line 205 connected to the reactor 207), a line 208 connecting reactor 207 to a sludge/water separator 209, lines 210 and 211 connected to the separator 209 for the evacuation of sludge and water respectively, and a line 212 with a pump 213 connecting the sludge pipe 210 to the bioheating reactor 202.

In operation, the sludge is fed via line 201 in the aerobic reactor 202. The oxidizer (air, or oxygen enriched air, or oxygen) is also fed into reactor 202. Optionally, nitrates, nitrites or other source of nitrogen are also added to reactor 202. In the reactor 202, organics of the sludge are oxidized and heat is generated. Accordingly, sludge temperature increases and viscosity of the liquid phase decreases, thus providing improved conditions for sludge/water separation. Most of the nitrogen forms in the liquid phase are converted into nitrites and nitrates. From reactor 202, sludge is transferred into the anaerobic reactor 207 via line 205. Optionally, nitrates and/or nitrites are added to the sludge in the line 205 or in the reactor 207. In reactor 207, aerobic sludge is converted into anaerobic sludge and at least partially digested. Digestion is enhanced and accelerated due to the elevated temperature of the sludge fed into the reactor 207. During digestion, carbon dioxide, methane, and nitrogen are produced in the form of small bubbles. The digesting sludge is transferred via line 208 to the flotation type sludge/water separator 209 wherein the bulk of sludge floats up and is evacuated through the pipe 210; the water is evacuated via pipe 211. Optionally, a portion of the floated sludge is recycled to the reactor 202 via line 212 with the use of conveying means (a pump) 213. The organic fraction of the recycled sludge is additionally oxidized in the aerobic process in reactor 202 thus providing higher temperature of the sludge in the reactor 202 and further down the flow. The anaerobic process rate and the sludge/water separation are accelerated at higher temperature.

FIG. 31 shows another system for sludge thickening comprising a feed pipe 201 connected to an aerobic bioheating reactor 202. Reactor 202 is provided with line 203 for oxidizer supply and optional means 204 for feeding titrates, nitrites or other sources of nitrogen. A branch 214 is connected to pipe 201 and leads to an anaerobic reactor 215 installed in parallel to reactor 202. The aerobic reactor 202 and anaerobic reactor 215 are connected to the anaerobic reactor 207 by pipes 205 and 216. The reactor 207 is optionally provided with a line 206 for feeding nitrates and/or nitrites. Reactor 207 is connected by means of pipe 208 to the sludge/water separator 209. Pipes 210 and 212 are provided in the separator 209 for evacuation of the floated sludge and water respectively. A branch 212 with a pump 213 is provided for recycling of a portion of the sludge to the aerobic reactor.

In addition to the process steps previously described, an anaerobic cultivation step, carried out in reactor 215, is employed in this system. In this step, anaerobic organisms are cultivated so that, when heated aerobic and anaerobic sludges are mixed, the anaerobic process in the reactor 207 is accelerated and the volume of this reactor is reduced. A portion of the recycled floated sludge can be optionally fed in the anaerobic cultivation step, reactor 215. This will increase temperature in the cultivation step and accelerate the process rate.

Figure 32:
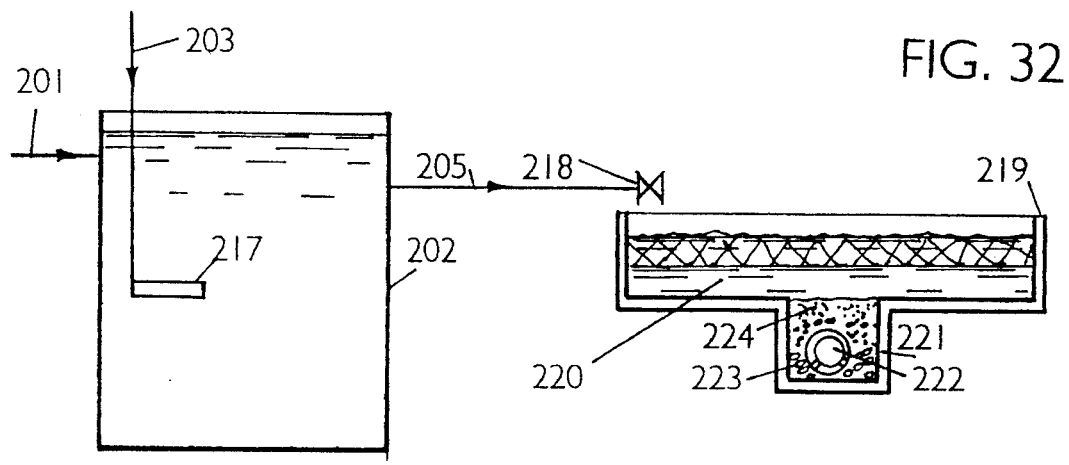
FIG. 32 is a schematic diagram of a system for sludge thickening, dewatering and drying comprising a bioheating unit and a drying bed functioning as sludge flotation thickener and a drying means.

FIG. 32 illustrates a system for sludge thickening and drying. The system comprises an aerobic bioheating reactor 202 fed with sludge via pipe 201 and oxidizer via line 203 and aerators 217. Reactor 202 is connected to a sludge bed 219 by a pipe 205 with a valve 218. The sludge bed 219 may have a concrete bottom 220 with one or several drainage channels 221 housing perforated drainage pipes 222. Pipes 222 are surrounded by a gravel layer 223 overlaid with a sand layer 224.

Operation of the system shown in FIG. 32 is as follows. Sludge is fed via pipe 201 into the reactor 202 and aerated by air (or oxygen enriched air, or by oxygen). During aeration, sludge becomes heated. A portion of the heated sludge is periodically transferred via pipe 205 by opening valve 218 onto the sludge bed 219. On the bed 219, sludge turns anaerobic, gases are generated, and the sludge particles are floated by these gases to the top of the sludge charge leaving the bottom layer as comparatively clear water. Clear water flows laterally to the channel 221, filters through the sand 224 and gravel 223 layers in the drainage pipe 222, and is evacuated from the system via drainage pipe 222. The floated sludge layer subsides and remains on the concrete floor 220 until dry. Dry sludge is removed from the bed manually or mechanically. A thin layer of sand over the channel 221 may also be removed. This sand should be replaced periodically with fresh sand.

Figure 33:
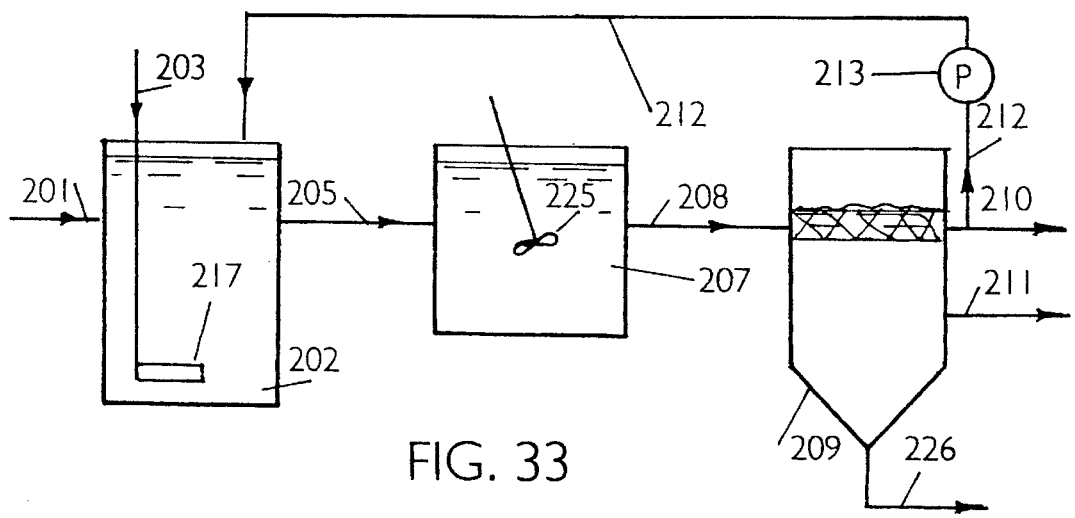
FIG. 33 is a schematic diagram of a system for continuous sludge thickening comprising a bioheating means, an anaerobic reactor and a sludge/water separator.

FIG. 33 illustrates another modification of the system for sludge thickening. This modification comprises an aerobic bioheating reactor 202 with line 201 for feeding the raw sludge, a line 203 and aerators 217 for feeding oxidizer (air, oxygen enriched air, or oxygen) and line 205 for transferring the bioheated sludge to the anaerobic reactor 207. Reactor 207 is equipped with a mixing means 225. This reactor is connected to the sludge/water separator 209 via pipe 208. Separator 209 is provided with pipes 210, 211, and 226 for removal of the floated sludge, clear water, and heavy sediments respectively. An optional sludge recycle pipe 212 with a pump 213 connects the line 210 with the reactor 202.

The system illustrated in FIG. 33 is operated in a continuous regime. Raw sludge is fed via pipe 201 into the reactor 202, oxidizer for aeration is supplied through the line 203 and aerators 217. Organic matter of the raw sludge is consumed and oxidized by bacteria, and the sludge is bioheated. The heated sludge is transferred via pipe 205 in the anaerobic reactor 207, wherein the contents are mixed by means 225. At least partial digestion of the sludge occurs in the reactor 207 and digestion gases are generated. After that, the sludge is conveyed to the sludge/water separator 209 via pipe 208. In the separator 209, gases float up the sludge particles and an underlying layer of comparatively clear water is formed. A small quantity of heavy particles settles down in the separator 209. Floated sludge is evacuated via pipe 210 and directed to a further treatment, for example, rotary dryer. A portion of the floated sludge is optionally recycled to the reactor 202 via pipe 212 by a pump 213. Clear water is discharged through the pipe 211, and heavy sediments are removed through the pipe 226.

Figure 34:
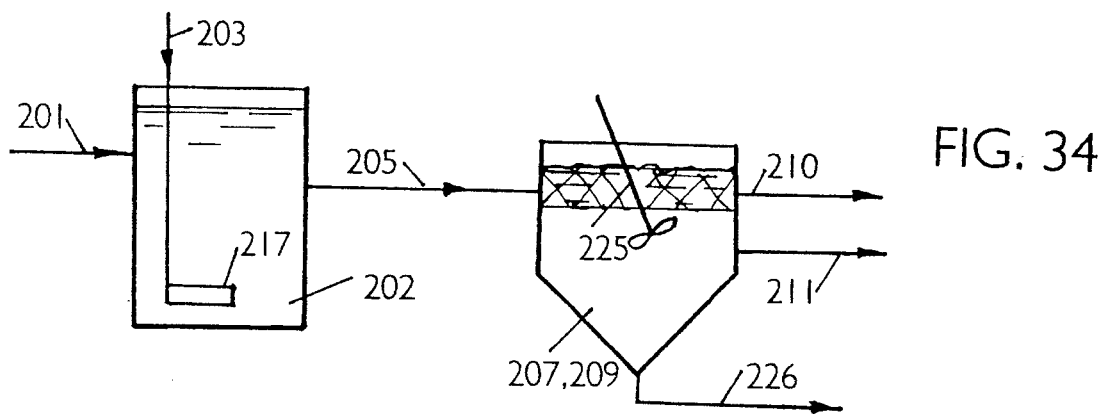
FIG. 34 is a schematic diagram of a system for periodic (batch) sludge thickening comprising a means for bioheating and a combined anaerobic reactor and sludge/water separator.

FIG. 34 illustrates a system for periodic (batchwise) treatment of sludge. The system comprises an aerobic reactor 202 for sludge bioheating and a reactor/separator 207, 209 for anaerobic digestion and sludge flotation. Reactor 202 is provided with a pipe 201 for feeding raw sludge and pipe 205 for transferring the bioheated sludge from reactor 202 to reactor 207, 209. An oxidizer line 203 and aerators 217 are provided in the reactor 202, while a mixer 225 is installed in the reactor 207, 209. Reactor 207, 209 is also provided with pipes 210, 211, and 226 for the evacuation of the floated sludge, discharge of the clarified water, and discharge of the heavier sediments.

The system illustrated in FIG. 34 is operated as follows. Raw sludge is fed in the reactor 202 by the pipe 201 until the maximum level is reached. During this fill time, the sludge is aerated with air, or oxygen, or oxygen enriched air, and becomes bioheated. A portion of the heated sludge equal to the volume of the reactor 207, 209 is transferred by the pipe 205 to the anaerobic reactor 207, 209. In this reactor, the sludge is at least partially digested and the anaerobic gases are generated. Mixing may be provided during the digestion period. After the digestion period, mixing is stopped and the sludge flotation is allowed to proceed. At the end of the flotation period, the sludge, clarified water, and heavier sediments are removed from the reactor 207, 209. By this time reactor 202 may already be filled again. Then, a portion of the heated aerobic sludge is transferred to the reactor 207, 209 and the batch cycle is repeated.

In view of the above and foregoing description and discussion, it will be understood that the present invention provides treatment systems that are great improvements over the prior art systems. In the systems of the present invention, optionally, technical oxygen or oxygen-enriched air can be used in aerobic conditioning steps. In addition to supporting aerobic processes, oxygen derived from any source will produce heating of the sludge, and the heat can be beneficial in all conditioning steps: the biological growth and matter transformation, and chemical processes will be faster; and, the reduced water viscosity will accelerate solid/water separation.

Aerobic process step can be used for removing heavy metals from the sludge. Under aerobic conditions, these metals solubilize due to oxidation of sulfides and can be removed by separating some water with metals from the sludge. A step of sludge heating by external means can be also provided.

The sludge conditioning step can be further enhanced by the use of reagents, for example sulfur-bearing materials for immobilization of heavy metals in the form of sulfides, and aluminum or iron salts for phosphorus and hydrogen sulfide control, and additional feed of organic waste. Organic solid waste or concentrated liquids, with or without water content, can also be fed into the conditioning steps for the purposes of treating these materials and enhancing sludge conditioning. These materials will also provide a mass for retaining specific constituents of wastewater, particularly slow and poorly degradable and toxic organics, and heavy metals. Simultaneously, combustible gas and fertilizer (biological solids with high nutrients and soil conditioning organics) can be produced. If oxygen is used in the sludge conditioning steps, heat can also be produced and utilized.

The conditioning process steps fulfill three major functions. First, a consortium of microorganisms and pools of (a) chemical compounds, (b) alkalinity reserve, (c) nutrients and micronutrients, and (d) enzymes generated by various types of microorganisms can be cultivated and formed in sludge conditioning steps. Second, the sludge can be cleaned from undesirable constituents, for example, heavy metals, and excessive amount of nutrients. Third, the constituents of wastewater which cannot be sufficiently treated and transformed in the reaction steps (slowly and poorly degradable and toxic) but can be incorporated in the sludge in the reaction step, for example by adsorption, biosorption, flocculation and coagulation with anaerobic sludge, are treated and largely transformed into the target final treatment products (gas, biological solids, water) in the sludge conditioning steps due to prolonged retention time and favorable conditions (temperature, mixing, chemical environment) in the sludge conditioning zone.

The functions of sludge conditioning are not separated from reaction steps in the known technologies, and therefore cannot be performed in a controllable way. The sludge components necessary for the anaerobic treatment cannot be formed in conventional systems, or can be only partially formed at longer retention times. The balance between the necessary components is difficult to maintain because there are no specifically assigned steps for cultivating and producing these components. Recycling of the intentionally and specifically conditioned sludge in the anaerobic reactor provides the components necessary for the anaerobic treatment of wastewater.

The single most important conditioning effect is provided by cultivating methanogenic organisms in the conditioning process step. The growth rate of methanogens is very low as compared to acidogenic organisms. Accordingly, the retention time must be very long to maintain both acidogens and methanogens in the anaerobic reactor. This is especially difficult at low substrate concentration, because the growth and accumulation of methanogens becomes extremely slow. In systems with the sludge conditioner, methanogens are grown at a high substrate and sludge concentration in a small volume conditioner. Concentrations in the sludge conditioner are controllable independently of the regimes in the anaerobic reactor. Enzymes generated by methanogens and capable of converting fatty acids are also produced in the conditioning process step. When wastewater influent is fed in the anaerobic reactor, the fast growing acidogenic organisms rapidly propagate, establish themselves at a sufficiently high concentration and produce fatty acids. The conditioned sludge fed into this reactor brings methanogenic organisms and enzymes previously generated by these organisms at high concentrations (which can be controlled by the design and by an operator). Fatty acids generated by acidogens are rapidly consumed by the recycled conditioned sludge rich with methanogens. Partially, organics in the anaerobic reactor are adsorbed in the biological flocks of sludge, suspended solids are flocculated and coagulated by the biological sludge. The sludge loaded with these organics is separated from the reactor effluent and undergoes the next round of conditioning, when the organics are largely decomposed and methanogens are cultivated. This sludge management strategy provides advantageous conditions for treatment of low strength waste, for degradation of suspended solids, for degradation of slowly and poorly degradable organics, and toxic organics. It also insures the stable presence of acidogenic and methanogenic organisms in the anaerobic reactor. The conditioned sludge contains substantial amounts of bicarbonates which provide good pH buffering. This buffering due to the recycled conditioned sludge and the uninterrupted presence of methanogens precludes acidification of the reactor contents.

The propagation, accumulation, and retention of methanogens in the sludge conditioner facilitates rapid start up of anaerobic systems. Systems with sludge conditioners can be started in weeks, or few months.

Massive toxic shocks affect only the biomass present in the reactor at the time of the slug. The bulk of the sludge inventory is stored off-line in the sludge conditioner, and therefore is spared from poisoning.

Recycling of the conditioned sludge helps to maintain the reactor's pH in the neutral to slightly alkaline range. Under such conditions, a large portion of hydrogen sulfide is dissociated into ions and is not volatile. Accordingly, sludge conditioning helps to reduce odor.

Reduction of sulfur bearing species, for example, sulfates or organics having sulfur, results in the formation of sulfides. Most heavy metals form poorly soluble sulfides; therefore, heavy metals can be precipitated and incorporated into sludge as salts of sulfides. If the sulfur content in the original wastewater influent is deficient, sulfur-containing reagents can be added to the reactor, or to the sludge conditioner. For example, the following reagents can be used: elemental sulfur, sulfuric acid, polysulfides, aluminum sulfate. These reagents will not increase the total dissolved solids (TDS) of the effluent, or will increase it only slightly. Other reagents, for example sodium sulfide or sodium sulfate, can also be used. However, these salts will increase the TDS more significantly.

The use of aluminum sulfate is also beneficial for removal of phosphates (a nutrient) in the form of poorly soluble aluminum phosphate, and for coagulation of suspended solids and biological solids in the reactor, which can be helpful for the separation step. Virtually all aluminum will be incorporated in the sludge.

If the contents of the sludge conditioner are heated, methanogens will grow sufficiently fast. Recycle of this conditioned sludge and associated enzymes into the anaerobic reactor will support degradation of fatty acids generated by the action of the acidogens, the organisms growing relatively fast even at submesophilic temperatures. Accordingly, the wastewater can be treated at low temperatures. As an option, the sludge heating can be provided by aerobic treatment of a portion or all the sludge being conditioned. Use of oxygen or oxygen-enriched air is helpful for reducing the heat loss by eliminating the heating of the nitrogen in the air. Combined aerobic-anaerobic sludge conditioning will also accelerate the sludge conditioning process and may be helpful in degrading certain compounds when oxidation and reduction reactions are useful. The aerobic treatment stage can either precede the anaerobic conditioning stage, or be parallel to the anaerobic stage with sludge being fed from the anaerobic stage to the aerobic stage and recycled after heating back to the anaerobic stage. A portion of the heat generated in the aerobic stage can be transferred to the anaerobic stage by the use of heat exchangers. Excess heat may be utilized for purposes other than waste treatment.

Removal and degradation of slowly and poorly degradable and toxic constituents can be further enhanced by adding adsorbents, particularly powdered activated carbon (PAC), to the wastewater influent or to the reactor, or to the sludge conditioner. PAC also improves the performance of the sludge separation step. Organics adsorbed on the PAC are retained in the system for a very long time. Moreover, the mobility of adsorbed organics between the water and the sludge phases is very limited. Accordingly, a high degree of transformation can be achieved even for slowly and poorly degradable and toxic organics. Such organics may include surfactants, dyes, and solvents, including halogenated solvents. In many industrial wastewater treatment systems, such organics are discharged periodically or occasionally. In order to keep the sludge adapted to such organics, a microfeed of such organics may be provided continuously.

Usually an anaerobic treatment system is a part of a wastewater treatment plant. Interconnections and interdependencies between unit processes and operations in the entire system should be considered when improving separate treatment processes. A novel method of improving hydraulic stability of anaerobic reactors includes the steps of feeding a variable flow of wastewater influent and a constant or variable flow of recycled water (after a given treatment unit, or after one or several subsequent units) into a fluid flow control box and discharging a constant flow from the flow control box. The discharge flow is equal to or greater than the maximum design flow of the wastewater influent. At any time, the sum of the feed to the control box is equal to, or greater than, the maximum design flow of the wastewater influent. The excess of the recycle feed to the control box is discharged to the point from which it was taken for recycle. This method insures a constant flow rate through the treatment units. Accordingly, operations of suspended sludge blanket reactors or clarifiers, settling tanks, filters, and other processes sensitive to the flow variations and surges are completely stabilized. In addition to hydraulic stability, recirculation of water produces equalization of concentrations of admixtures and sludge. Moreover, recirculation of water into an anaerobic reactor after, for example, an aerobic treatment with nitrification will reduce the nitrates and nitrites in the recycled portion of water. Aerobically treated water is usually rich in bicarbonates. The reduction of nitrates and nitrites and feeding of bicarbonates will increase alkalinity in the anaerobic reactor and reduce pH variations. Equalizations of flows, concentrations of admixtures and concentrations of sludge will improve stability of the biological consortia in the system. The dilution of the contents of the anaerobic reactor by the recycled treated water reduces concentrations of chelating compounds in the anaerobic reactor. This results in better removal of heavy metals in the form of sulfides.

Removal of slowly and poorly degradable and toxic organics, and also heavy metals, can be further improved by the use of a multiple stage anaerobic system with sludge conditioning steps. Such a system will also be able to increase the efficiency of organics removal as determined by COD or BOD. Preferably, the sludge from the downstream stages is used in the upstream stages. The same or different conditioning methods can be used in different stages. The improved removal of specific constituents is due to counterflow of water and sludge. In the first stage, the sludge meets specific constituents and removes the bulk of them. This sludge is gradually discharged from the system. In the second stage, the wastewater with a significantly depleted amount of specific constituents is contacting a cleaner sludge (sludge grown in the second stage on wastewater with depleted specific constituents). This sludge removes the bulk of the residual specific constituents in the wastewater. Accordingly, removal of specific admixtures is improved in multistage systems. Some process steps and treatment units for sludge conditioning can be shared by various process stages.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. The method of treatment of influent material comprising the steps of controllable converting at least a portion of the influent material in an anaerobic reactor whereby the constituents of said material are controllably converted into water, gas, residual organics and a first anaerobic sludge, removing the said gas from the said reactor, separating the liquid effluent of the reactor from the said first anaerobic sludge, conditioning the said first anaerobic sludge by converting constituents thereof for converting said first anaerobic sludge to a second anaerobic sludge, and directing at least a portion of the said second anaerobic sludge to said anaerobic reactor.

2. The method as claimed in claim 1, wherein said influent material is selected from the group consisting of water, wastewater, aqueous industrial and production streams, industrial and production gases, gaseous and vent emissions, solid waste, materials of plant, animal or, fossil origin, and solid industrial and production streams, and combinations thereof.

3. The method as claimed in claim 1, wherein the said step or removing the said gas is carried out by releasing it to the atmosphere.

4. The method as claimed in claim 1, wherein the said step of removing the said gas is carried out by collecting it for subsequent utilization.

5. The method as claimed in claim 1, wherein the said step of conditioning the said anaerobic sludge further includes the step of adding a chemical to said anaerobic sludge, said chemical being selected from the group consisting of nutrients, sulfur bearing reagents, coagulants, neutralizing agents, adsorbents, oxyions including nitrite and nitrate, liquid and solid organics of plant, animal or fossil origin, and a microfeed of specific constituents otherwise periodically present in the influent material.

6. The method as claimed in claim 1, wherein the said step of conditioning the said anaerobic sludge comprises anaerobically treating said sludge.

7. The method as claimed in claim 6, wherein the said anaerobic treatment of said sludge additionally involves mixing.

8. The method as claimed in claim 5, wherein the said step of conditioning the said anaerobic sludge is carried out in a plurality of conditioners connected in parallel.

9. The method as claimed in claim 8, wherein the said step of directing at least a portion of the conditioned anaerobic sludge to said anaerobic reactor is carried out sequentially among said plurality of conditioners.

10. The method as claimed in claim 6, wherein the said step of conditioning the said anaerobic sludge is carried out in a plurality of continuously operated conditioners connected in parallel, and wherein each conditioner of said plurality of conditioners has a different retention time from the other conditioners of said plurality of conditioners.

11. The method as claimed in claim 1, wherein the said step of conditioning the said anaerobic sludge is carried out using a combination of anaerobic and aerobic process steps, and including the step of adding a gas to said aerobic process steps, the gas in the said aerobic step being selected from the group consisting of air and oxygen, and combinations thereof in proportions from 0 to 100%.

12. The method as claimed in claim 11, wherein the said anaerobic and aerobic process steps are connected in parallel.

13. The method as claimed in claim 11, wherein the said aerobic and anaerobic process steps are connected in series.

14. The method as claimed in claim 1, wherein a plurality of sludge separation steps is used.

15. The method as claimed in claim 1, wherein the said step of controllably converting is carried out in a complete treatment mode by providing the retention time in the said reactor sufficient for completing the acidogenic conversion phase of dissolved organics, and by recycling an excess of methanogenic organisms from the sludge conditioner for complete conversion of fatty acids into final metabolic products.

16. The method as claimed in claim 15 and further including the step of accelerating the process rate of the said complete treatment by recycling the acidogenic organisms by the use of a sludge separation step followed by a zero retention time sludge conditioning step.

17. The method as claimed in claim 1, wherein the said step of controllably converting is carried out in incomplete treatment mode by selecting one or a combination of options from the following group:
  a. Deficient growth of acidogenic organisms in the said reaction step and deficient recycle of acidogenic organisms from the said sludge conditioning step; and
  b. Deficient recycle of methanogenic organisms from the said sludge conditioning step.

18. The method as claimed in claim 1, wherein the said step of separating the liquid effluent from the anaerobic sludge is followed by a second stage of said treatment, said second stage of said treatment comprising the steps of feeding said liquid effluent to a second reactor, separating the sludge form the output of said second reactor, and mixing said sludge from the output of said second reactor with said anaerobic sludge being conditioned.

19. The method as claimed in claim 18, wherein the said second reactor is an aerobic reactor.

20. The method as claimed in claim 1, wherein the said step of conditioning the said anaerobic sludge is carried out in a lower section within the said anaerobic reactor, and including the step of directing at least a portion of said anaerobic sludge separated from liquid effluent to the said anaerobic reactor.

21. The method as claimed in claim 20, wherein the said step of conditioning the said anaerobic sludge is carried out in the said lower section divided into a plurality of compartments.

22. The method as claimed in claim 20, wherein the said step of controllably converting the influent material in an anaerobic reactor is added with a step of aerobic conversion carried out in a section disposed above the said anaerobic reactor.

23. The method as claimed in claim 22, wherein the said step of aerobic conversion is carried out by the use of a method selected from the group consisting of:
  a. suspended growth;
  b. attached growth on submerged media; and
  c. attached growth on vented biofiltration media.

24. The method as claimed in claim 21, wherein the said step of conditioning the said anaerobic sludge includes grit removal at the inverted pyramidal bottoms of the said compartments.

25. The method as claimed in claim 1, wherein the said anaerobic treatment method is operated in incomplete treatment mode and is coupled with an aerobic treatment step, and the sludge discharged from the said aerobic treatment is directed to the said anaerobic reactor.

26. The method as claimed in claim 25, wherein the said aerobic treatment step is selected from the group consisting of an activated sludge process fed with the effluent from the said sludge separator in the said anaerobic treatment, and an attached biofilm growth process fed with the effluent from the said sludge separator in the said anaerobic treatment.

27. The method as claimed in claim 26, and including the step of stacking said attached biofilm growth process on top of said anaerobic reactor for accepting and treating the volatile constituents from said anaerobic reactor.

28. The method as claimed in claim 25, including the step of recycling a portion of the effluent from the said aerobic treatment to the said anaerobic reactor.

29. The method as claimed in claim 25, and including the step of stabilizing material flows, comprising the steps of combining a portion of the recycled flow with the entire influent to form a combined flow approximately equal to or greater than the maximum influent flow, transferring the said combined flow to the subsequent treatment steps, and discharging the balance of treated water.

30. The method as claimed in claim 25, wherein a portion of the effluent from the said aerobic treatment at least equal to the difference between the maximum and the minimum flow rate of the wastewater influent to the treatment system is recycled to the flow equalization device preceding the said anaerobic reactor, the said flow equalization device being capable of complementing the instantaneous flow with the quantity of the said recycled aerobic effluent needed to produce the combined feed rate into the said anaerobic reactor at least equal to the maximum flow rate of the wastewater influent.

31. A method of biological conversion of materials in a dual sludge system comprising the steps of growing a first sludge, simultaneously growing methanogenic sludge, and feeding said material and said methanogenic sludge into said first sludge during the said step of growing the said first sludge.

32. A method as claimed in claim 31, wherein said first sludge is an acidogenic sludge.

33. A method as claimed in claim 31, wherein said first sludge is an aerobic sludge.

* * * * *